United States Patent
Matsuo et al.

(10) Patent No.: US 8,079,935 B2
(45) Date of Patent: Dec. 20, 2011

(54) SHIFT CONTROL DEVICE FOR AUTOMATIC TRANSMISSION AND SHIFT CONTROL METHOD THEREOF

(75) Inventors: Katsuhiro Matsuo, Isehara (JP); Satoshi Takizawa, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 476 days.

(21) Appl. No.: 12/401,363

(22) Filed: Mar. 10, 2009

(65) Prior Publication Data
US 2009/0247359 A1 Oct. 1, 2009

(30) Foreign Application Priority Data
Mar. 28, 2008 (JP) ................................. 2008-086470

(51) Int. Cl.
*F16H 59/00* (2006.01)
(52) U.S. Cl. ......................................... 477/98; 477/901
(58) Field of Classification Search .................... 477/97, 477/98, 901; 701/62
See application file for complete search history.

(56) References Cited

U.S. PATENT DOCUMENTS

| | | | | |
|---|---|---|---|---|
| 5,680,307 A | * | 10/1997 | Issa et al. | 701/52 |
| 6,085,139 A | * | 7/2000 | Nakauchi et al. | 701/52 |
| 6,645,121 B2 | * | 11/2003 | Wu et al. | 477/98 |
| 2008/0096720 A1 | * | 4/2008 | Watanabe | 477/98 |
| 2009/0082174 A1 | * | 3/2009 | Ikeda et al. | 477/98 |
| 2009/0082933 A1 | * | 3/2009 | Ikeda et al. | 701/62 |

FOREIGN PATENT DOCUMENTS

| | | |
|---|---|---|
| JP | 3402220 B2 | 2/2003 |
| JP | 2005-076768 A | 3/2005 |
| JP | 2007-263172 A | 10/2007 |

* cited by examiner

*Primary Examiner* — Roger Pang
(74) *Attorney, Agent, or Firm* — Foley & Lardner LLP

(57) ABSTRACT

A shift control device comprises: a thermal load prediction unit which predicts a thermal load state of a friction element upon completion of a shift from a current thermal load state of the friction element; and a shift control unit which, when the thermal load state upon shift completion predicted by the thermal load prediction unit corresponds to a predetermined state, either performs the shift in a modified shift mode in which a heat generation amount of the friction element is smaller than the heat generation amount of the friction element when the predetermined state is not established, or prohibits the shift. The predetermined state is set at a different state in a case where the shift is an upshift and in a case where the shift is a downshift, and is set on the basis of a gradient of a traveling road.

18 Claims, 24 Drawing Sheets

| GEAR POSITION | FRICTION ELEMENT | | | | |
|---|---|---|---|---|---|
| | FIRST CLUTCH 15 | SECOND CLUTCH 17 | THIRD CLUTCH 19 | FIRST BRAKE 22 | SECOND BRAKE 23 |
| FIRST SPEED | O | | | | |
| SECOND SPEED | O | | | O | |
| THIRD SPEED | O | O | | | |
| FOURTH SPEED | | O | O | | |
| REVERSE | | | | O | O |

*FIG. 3*

SHIFT CONTROL DEVICE FOR AUTOMATIC TRANSMISSION AND SHIFT CONTROL METHOD THEREOF

TECHNICAL FIELD

This invention relates to a shift control device for an automatic transmission, and a shift control method thereof.

BACKGROUND OF THE INVENTION

In a typical, well-known automatic transmission for an automobile, the rotation of an engine is input via a torque converter, speed-varied by a shift mechanism having a plurality of planetary gears, and then output to a drive shaft or a propeller shaft (axle side).

The shift mechanism in this type of automatic transmission executes a shift by transmitting the rotation of an input shaft to a specific gear or carrier of the planetary gear in accordance with a shift position, and transmitting the rotation of the specific gear or carrier to an output shaft appropriately. Further, a plurality of friction elements such as clutches and brakes are provided to constrain the rotation of the specific gear or carrier appropriately during the shift, and a predetermined shift is performed by switching a transmission path through engagement and disengagement combinations of the friction elements. Furthermore, hydraulic clutches and brakes, the engagement state of which is controlled in accordance with an oil pressure supply/discharge state, are normally used as the friction elements.

When a predetermined shift is performed in a conventional automatic transmission while the vehicle is traveling near a boundary region of a vehicle traveling condition, a selected gear position varies such that the shift is performed repeatedly. For example, when a 3-4 shift is performed from a third speed to a fourth speed, a 3-4 shift from the third speed to the fourth speed and a 4-3 shift from the fourth speed to the third speed are performed repeatedly, leading to a continuous shift in the form of 3-4-3-4- . . . .

When a shift is performed continuously in this fashion, the same friction element is engaged and disengaged repeatedly over a long time period, and therefore a thermal load applied to the friction element increases (the temperature rises). As a result, the friction element may suffer burnout. It should be noted that in this specification, the term "thermal load" is used to mean "temperature" or "generated heat".

In response to this problem, JP3402220B discloses a technique employing a timer. More specifically, the timer is counted down during a continuous shift, and when the timer value reaches a predetermined value, subsequent shifts are prohibited under the assumption that the thermal load state (temperature) of the friction element has reached a burnout temperature. Further, when the continuous shift ends before a set value has been reached, the timer is counted up on a constant gradient under the assumption that heat radiation is underway.

Hence, when a continuous shift resumes immediately after the end of a continuous shift, the countdown begins from a smaller value than the initial value of the timer value, and thus control is executed taking into account an accumulated heat amount of the friction element.

SUMMARY OF THE INVENTION

However, in JP3402220B, only time is used as a parameter, irrespective of shift type and input torque, and the type of the subsequent shift is not taken into consideration. Hence, the predetermined value of the timer value for determining shift prohibition is set such that the friction element does not burn out, regardless of the type of the subsequent shift. In other words, the predetermined value of the timer value is set at a value having a considerable margin relative to an actual burnout temperature to ensure that the friction element does not burn out even when a shift that generates a maximum heat amount is performed. Accordingly, shifts are prohibited without exception, even when the determined shift is not a shift that generates a large amount of heat and the friction element would not reach the burnout temperature if the shift were performed, and as a result, drivability deteriorates.

In particular, when the shift is a downshift, an upshift is likely to occur immediately after the downshift to prevent over-revving of the engine, and it is therefore necessary to allow for a correspondingly larger heat generation amount from the downshift than the upshift. Hence, when the predetermined value for determining shift prohibition is set identically regardless of the shift type, upshift side shifts are limited excessively, leading to an increase in fuel consumption.

Moreover, when the predetermined value for determining shift prohibition is set identically regardless of the traveling condition, downshifts are prohibited in an identical manner during travel on uphill roads, when driving force deficiencies occur, and flat roads. As a result, a driving force deficiency occurs, and the traveling performance deteriorates.

It is therefore an object of this invention to prevent deterioration of drivability by improving shift allowance.

According to an aspect of the present invention, a shift control device for an automatic transmission, which executes a shift from a current gear position to a target gear position by selectively engaging and disengaging a plurality of friction elements, is provided. The shift control device comprises: a thermal load prediction unit which predicts a thermal load state of the friction element upon completion of the shift from a current thermal load state of the friction element; and a shift control unit which, when the thermal load state upon shift completion predicted by the thermal load prediction unit corresponds to a predetermined state, either performs the shift in a modified shift mode in which a heat generation amount of the friction element is smaller than the heat generation amount of the friction element when the predetermined state is not established, or prohibits the shift, wherein the predetermined state is set at a different state in a case where the shift is an upshift and in a case where the shift is a downshift, and is set on the basis of a gradient of a traveling road.

According to another aspect of the invention, a shift control method for an automatic transmission, which executes a shift from a current gear position to a target gear position by selectively engaging and disengaging a plurality of friction elements, is provided. The shift control method comprises: predicting a thermal load state of the friction element upon completion of the shift from a current thermal load state of the friction element; when the predicted thermal load state upon shift completion corresponds to a predetermined state, either performing the shift in a modified shift mode in which a heat generation amount of the friction element is smaller than the heat generation amount of the friction element when the predetermined state is not established, or prohibiting the shift, and setting the predetermined state on the basis of a gradient of a traveling road at a different state in a case where the shift is an upshift and in a case where the shift is a downshift.

Embodiments and advantages of this invention will be described in detail below with reference to the attached drawings.

BRIEF DESCRIPTION OF THE DRAWINGS

FIG. 3 is a view showing engagement states of friction elements in each gear position of the shift control device for the automatic transmission.

DESCRIPTION OF THE PREFERRED EMBODIMENTS

Embodiments of this invention will be described below with reference to the attached drawings.

First Embodiment

Figure 1:
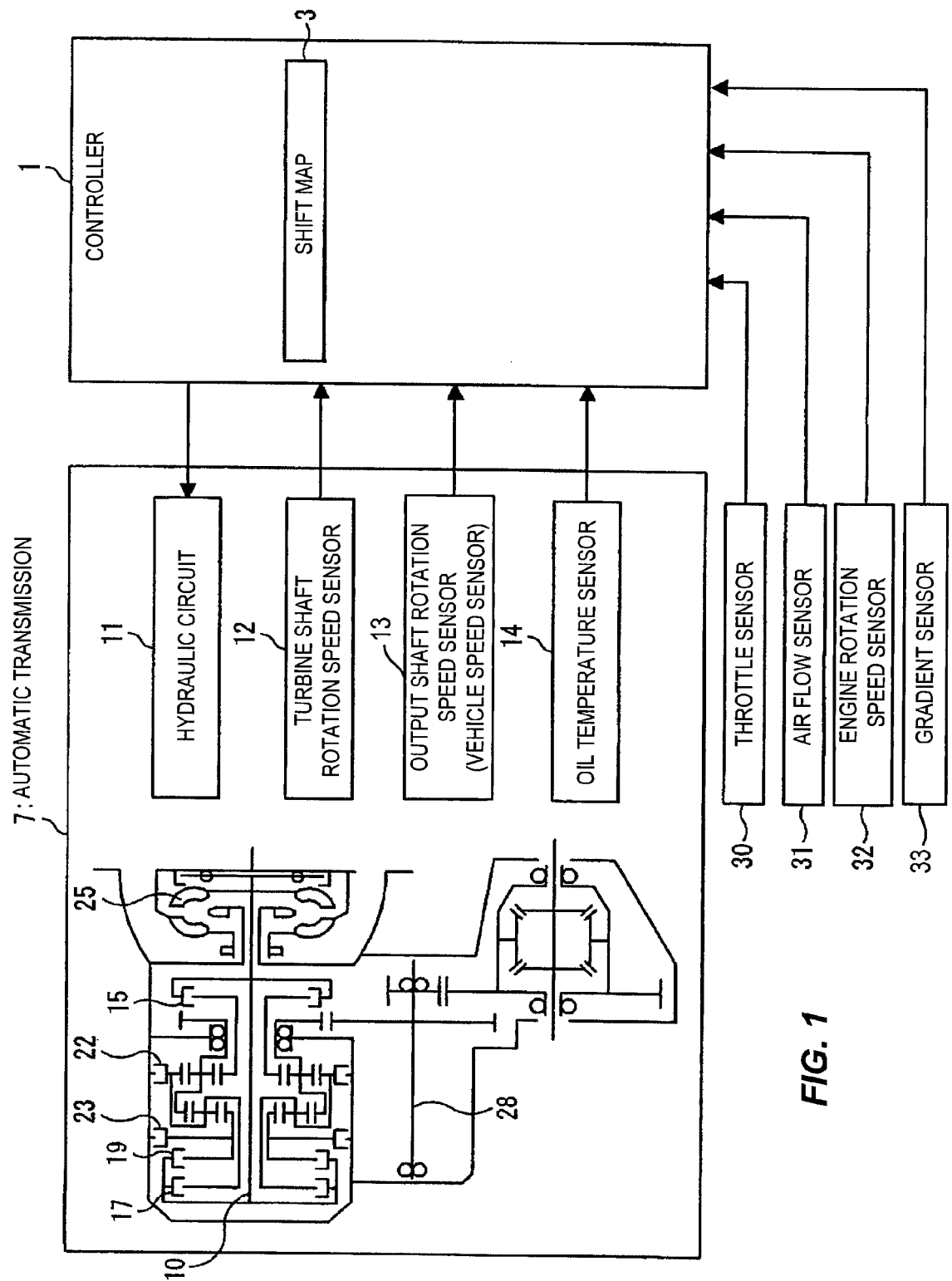
FIG. 1 is a function block diagram showing the constitution of a shift control device for an automatic transmission.
Figure 2:
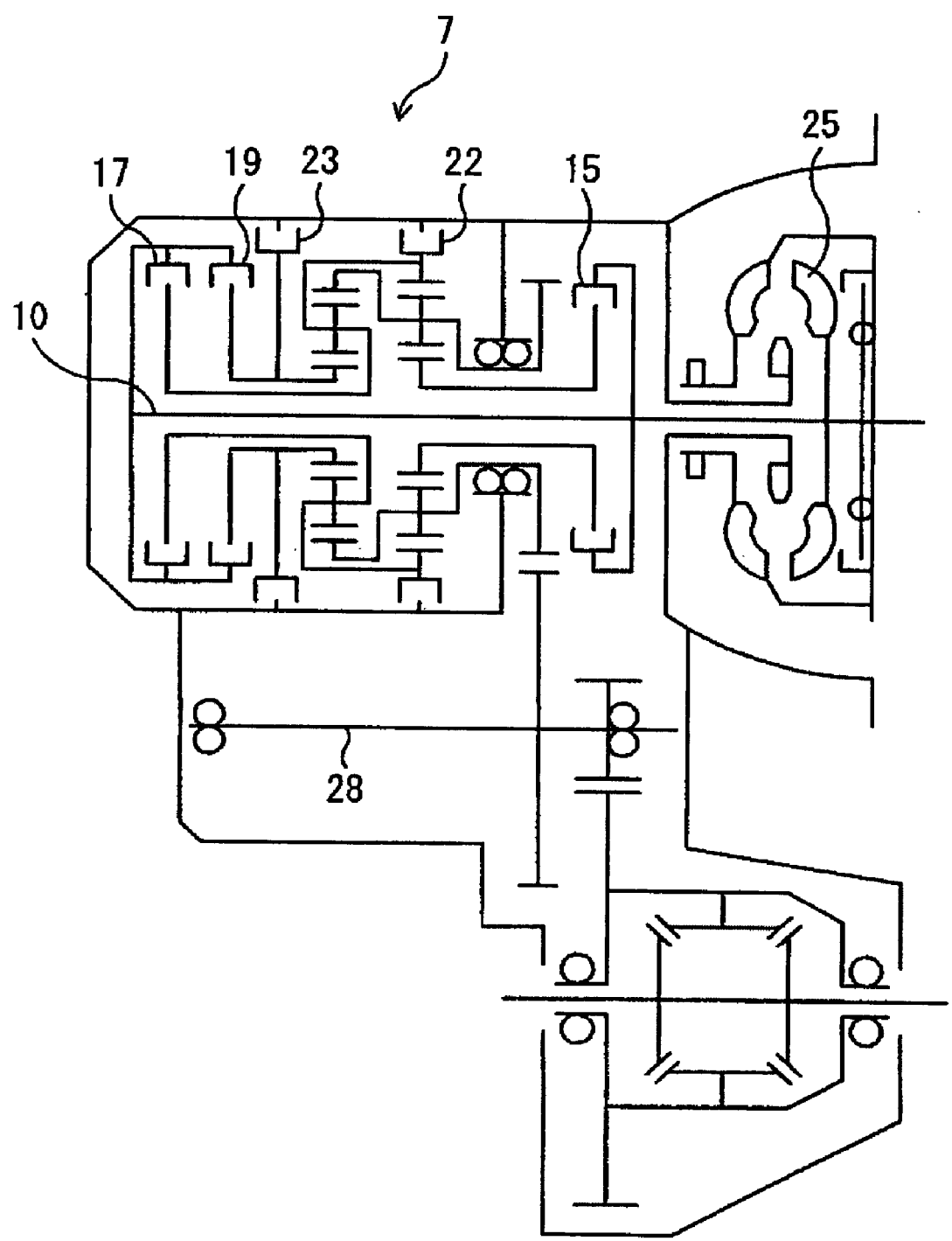
FIG. 2 is a skeleton diagram showing the structure of the automatic transmission.

FIG. 1 is a function block diagram showing the constitution of a shift control device for an automatic transmission according to a first embodiment. FIG. 2 is a skeleton diagram showing the constitution of the automatic transmission.

This shift control device is constituted by a controller 1, various sensors including an input shaft rotation speed sensor (turbine shaft rotation speed sensor) 12 that detects a rotation speed NT of a turbine 25 and a turbine shaft 10, an output shaft rotation speed sensor (vehicle speed sensor) 13 that detects a rotation speed No of an output shaft 28, an oil temperature sensor 14 that detects a temperature of an ATF (automatic transmission oil), a throttle sensor 30 that detects a throttle opening of an engine, not shown in the figures, an air flow sensor 31 that detects an intake air amount of the engine, an engine rotation speed sensor 32 that detects an engine rotation speed NE and a gradient sensor 33 that detects a gradient α of a road surface (hereafter, traveling road) along which the vehicle is currently traveling, and a hydraulic circuit 11 of an automatic transmission 7. The shift control device uses the controller 1 to determine a desired target gear position on the basis of detection signals from each of the aforementioned sensors 12, 13, 14, 30, 31, 32, 33, and so on, and perform shift control to achieve the target gear position via the hydraulic circuit 11.

The gear position of the automatic transmission 7 is determined according to engagement relationships between planetary gear units provided in the automatic transmission 7 and a plurality of friction elements such as hydraulic clutches and hydraulic brakes. For example, FIG. 1 shows a case in which the automatic transmission 7 has four gear positions and comprises a first clutch 15, a second clutch 17, a third clutch 19, a first brake 22, and a second brake 23 as friction elements. FIG. 2 shows the automatic transmission 7 in detail. In FIG. 2, reference numerals indicating the respective friction elements correspond to those shown in FIG. 1.

Control of the friction elements 15, 17, 19, 22, 23 by the controller 1 is performed via the hydraulic circuit 11 shown in FIG. 1. More specifically, the hydraulic circuit 11 is provided with a plurality of solenoid valves, not shown in the figures, and by driving (duty-controlling) these solenoid valves appropriately, ATF pumped from an oil pump is supplied to the friction elements 15, 17, 19, 22, 23. The controller 1 determines the target gear position on the basis of the throttle opening, which is calculated on the basis of the throttle opening detected by the throttle sensor 30 and the rotation speed No of an output shaft 28 detected by the output shaft rotation speed sensor 13, and outputs drive signals (duty ratio signals) to the solenoid valves of the friction elements 15, 17, 19, 22, 23 that contribute to a shift to the determined target gear position. It should be noted that the ATF is regulated to a predetermined oil pressure (a line pressure) by a regulator valve, not shown in the figures, and supplied to the hydraulic circuit 11 to activate the respective friction elements 15, 17, 19, 22, 23 after being regulated to the line pressure.

A shift map 3 is provided in the controller 1. Further, a selector lever (not shown) for switching an operating mode is attached to the automatic transmission 7 so that by operating the selector lever, a driver can select a position manually from among a P position, a D position (a first speed to a fourth speed are available, for example), an N position, an R position, and so on.

The D position includes two shift modes, namely an automatic shift mode and a manual shift mode. When the automatic shift mode is selected, a shift determination is performed on the basis of a throttle opening $\theta_{TH}$ and a vehicle speed V in accordance with the preset shift map 3, and a shift is implemented automatically in accordance with this determination. When the manual shift mode is selected, on the other hand, the gear position is shifted to a gear position selected by the driver, regardless of the shift map 3, and then the selected gear position is kept.

Figure 4:
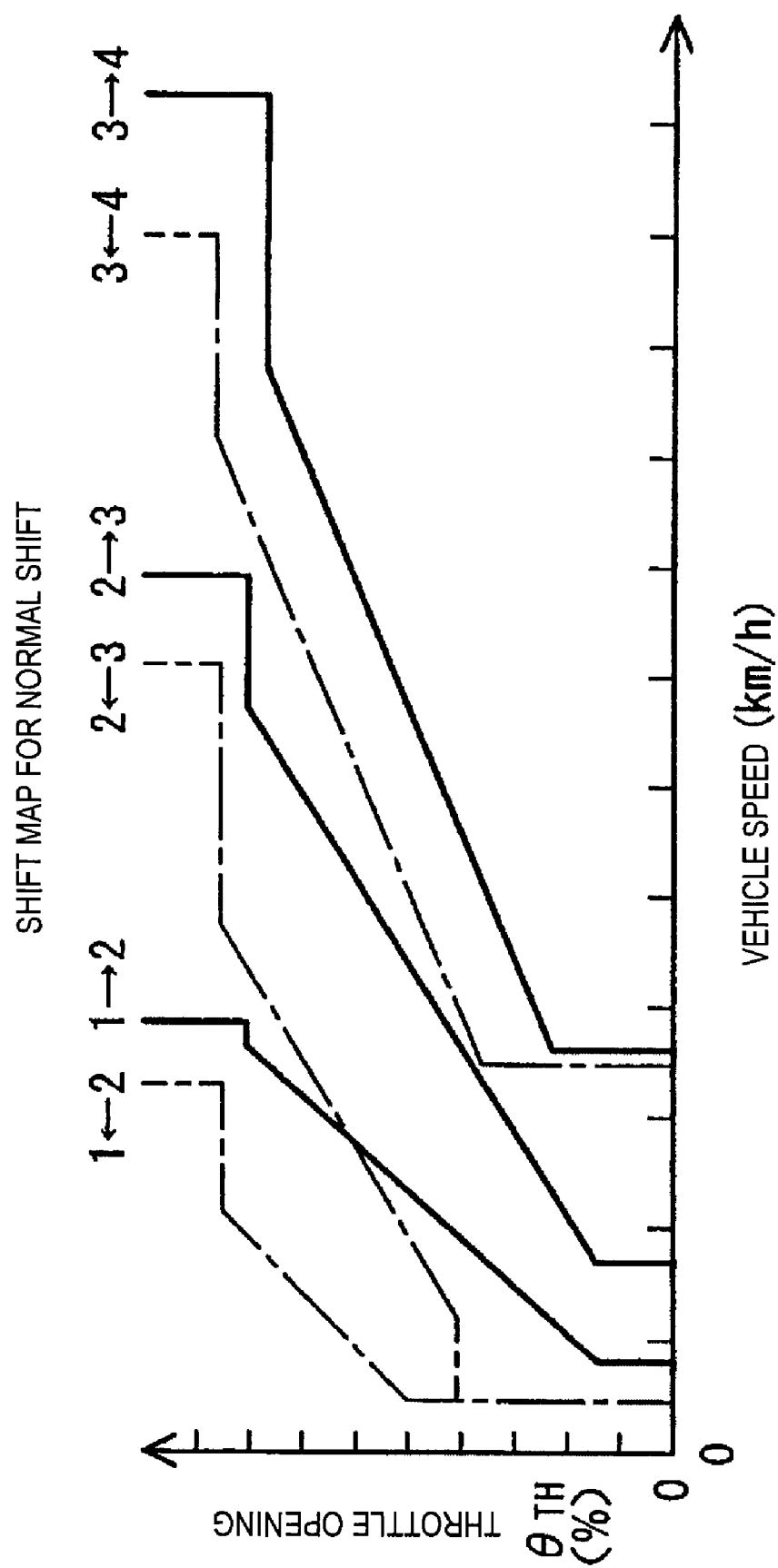
FIG. 4 is a view showing a shift map of the shift control device for the automatic transmission.

Characteristics such as those shown in FIG. 4, for example, are stored in the shift map 3. During a normal shift in which the shift is implemented automatically, a target gear position corresponding to the vehicle speed V detected by the vehicle speed sensor 13 and the throttle opening $\theta_{TH}$ detected by the throttle sensor 30 is set on the basis of the shift map 3 shown in FIG. 4, and the friction elements including the first to third clutches 15, 17, 19 and the first and second brakes 22, 23 are controlled by the solenoid valves set respectively therein such that each gear position is established automatically in accordance with engagement and disengagement combinations such as those shown in FIG. 3. It should be noted that the circle mark in FIG. 3 indicates engagement of a clutch or a brake.

As shown in FIG. 3, for example, when the first clutch 15 and second brake 23 are engaged and the second clutch 17, third clutch 19, and first brake 22 are disengaged, a second speed is achieved. A shift from the second speed to a third speed is achieved by disengaging the engaged second brake 23 and engaging the second clutch 17. The engagement state of the friction elements 15, 17, 19, 22, 23 is controlled by the controller 1, and the gear position is determined from the engagement relationships of the friction elements 15, 17, 19, 22, 23. Moreover, shift control is performed while appropriately taking into account the engagement timing and disengagement timing.

During a shift, a drive signal is output to the respective solenoid valves from the controller 1, and on the basis of this drive signal, the solenoid valves are driven by a predetermined duty value (duty ratio). Thus, optimum shift control producing a favorable shift feeling is executed.

Next, the main parts of this embodiment will be described in detail. This device constantly calculates a current thermal load state (temperature) of each friction element (to be referred to simply as "clutch" hereafter), and having determined a shift, estimates a temperature increase $T_{INH}$ of the corresponding clutch during the shift and either prohibits or permits the shift on the basis of the result.

More specifically, a continuous shift may occur when an operating point crosses an upshift line and a downshift line of the shift map 3 continuously and repeatedly, for example when a 3-4 shift and a 4-3 shift are performed repeatedly between the third speed and fourth speed such that a continuous shift is performed in the form of 3-4-3-4- . . . . Alternatively, a similar 3-4-3-4- . . . continuous shift may occur when the driver operates the selector lever to switch between the third speed and the fourth speed frequently.

When a continuous shift is performed in this fashion, specific clutches (in the case of a 3-4 continuous shift, the first clutch 15 and the second brake 23; see FIG. 3) are engaged and disengaged repeatedly, and when engagement and disengagement are executed repeatedly within a brief time period in this manner, a heat capacity of the clutch increases (the temperature increases). As a result, the clutch or brake may be burned out.

Furthermore, when shifts are prohibited simply by predicting the thermal load state of the clutch using a timer without taking into account the shift type, the engagement/disengagement state, and the input torque, as in the related art, the temperature of the clutch or the like cannot be obtained accurately. Accordingly, a threshold for determining shift prohibition is set at a value having a considerable margin to ensure that the clutch does not reach a burnout temperature even if a shift that generates a maximum heat amount is performed, and as a result, a shift may be prohibited even when the shift is allowable, leading to a reduction in drivability.

Figure 5:
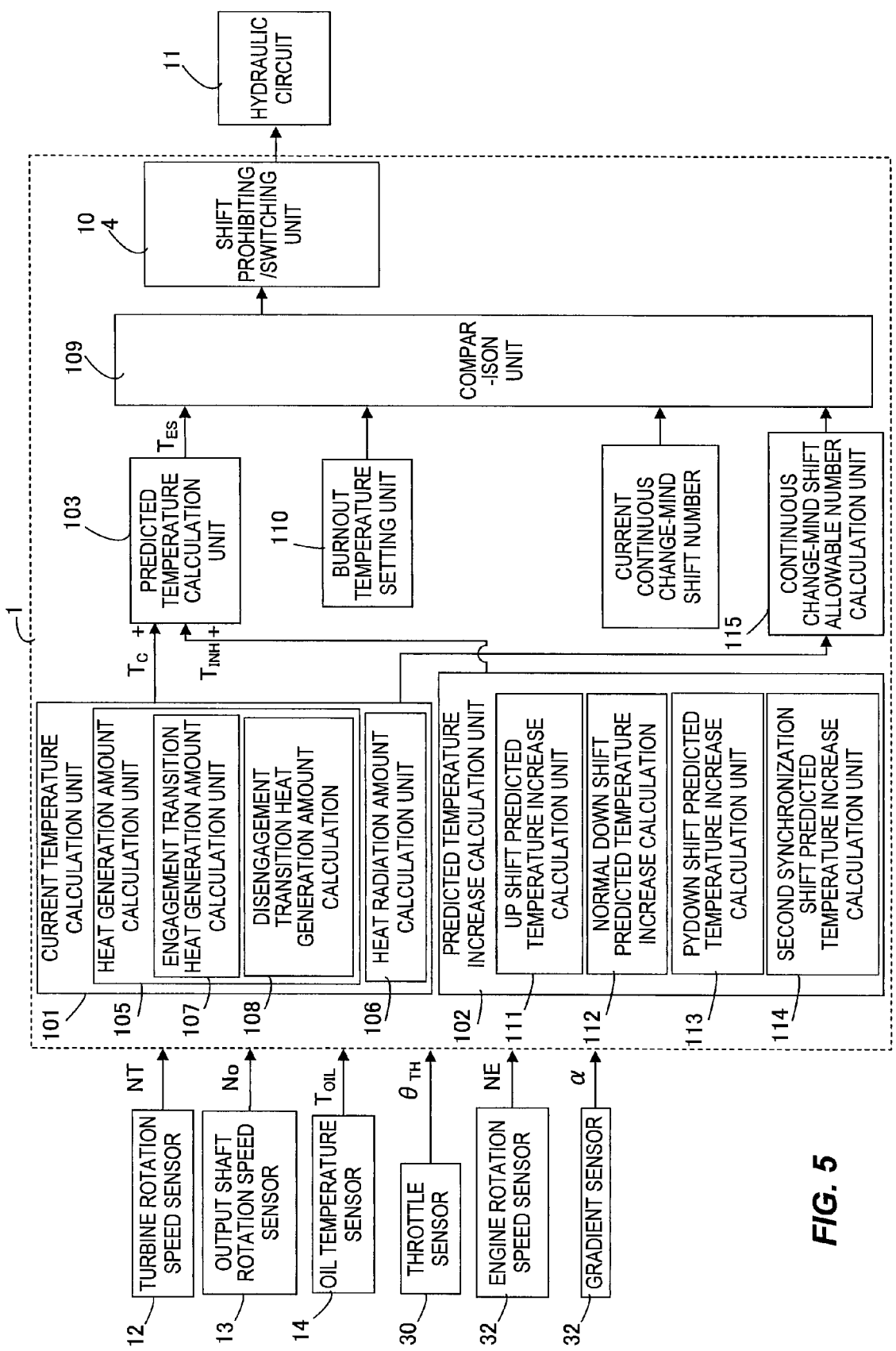
FIG. 5 is a block diagram showing control of the shift control device for the automatic transmission.

Hence, in this embodiment, a thermal load state (current temperature) is calculated for each clutch, and when a shift is determined, the temperature increase of each clutch is predicted. In so doing, shift prohibition and permission can be determined accurately. More specifically, as shown in FIG. 5, in addition to the shift map 3, the controller 1 includes a current temperature calculation unit 101 that calculates the current temperature of each clutch, a predicted temperature increase calculation unit 102 that predicts the temperature increase $T_{INH}$ of the clutch during the next shift, a predicted temperature calculation unit 103 that determines a predicted temperature $T_{ES}$ of the clutch following the next shift on the basis of the current temperature and predicted temperature increase of the clutch, a comparison unit 109 that compares the predicted temperature $T_{ES}$ to a predetermined threshold, and a shift prohibiting/switching unit 104 that permits or prohibits the next shift or switches the next shift to another shift on the basis of whether or not the comparison unit 109 determines that the predicted temperature $T_{ES}$ is equal to or greater than a predetermined value.

First, the current temperature calculation unit 101 will be described.

The current temperature calculation unit 101 successively calculates and updates the current temperature of each clutch, and an initial value thereof at the time of engine start-up is set at an ATF temperature $T_{OIL}$ obtained by the oil temperature sensor 14. The reason for this is that at the time of engine start-up, the temperature of each clutch of the transmission 7 may be considered substantially equal to the oil temperature $T_{OIL}$.

Figure 6:
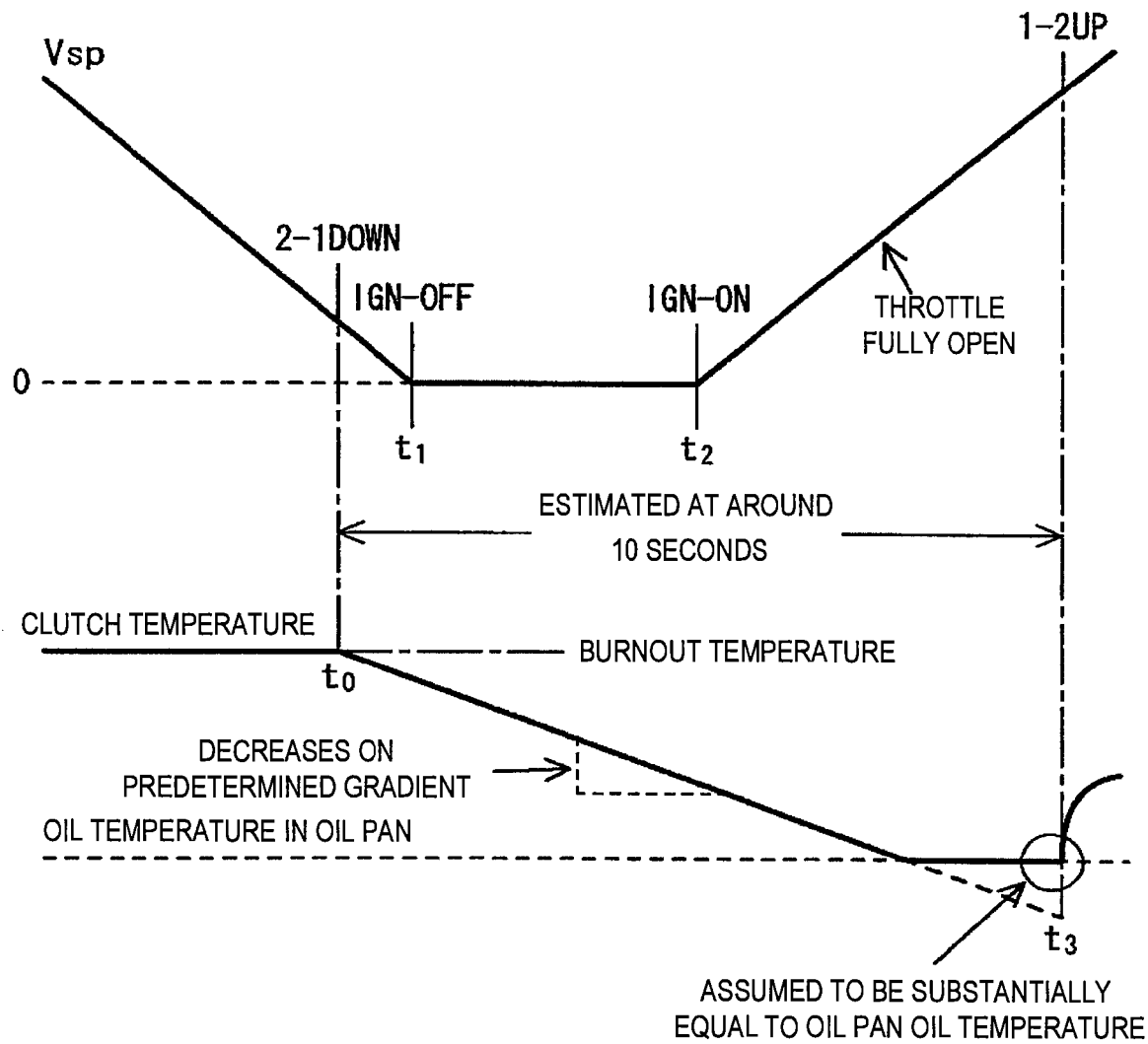
FIG. 6 is a view illustrating a clutch temperature initial value of the shift control device for the automatic transmission.

FIG. 6 is a view verifying the appropriateness of applying the oil temperature $T_{OIL}$ as the initial clutch temperature value at the time of engine start-up. In the figure, $V_{SP}$ denotes the vehicle speed.

As shown in the figure, the temperature of the clutch (in this embodiment, the second brake 23; see FIG. 3) that is engaged during a shift from the first speed to the second speed is held intentionally at a temperature at which burning may occur (a burnout temperature), and in this state, the vehicle speed is reduced along a constant gradient. When the vehicle speed $V_{SP}=0$ following a downshift to the first speed, the ignition is switched OFF (IGN-OFF) and the engine is stopped (see t1 in the figure). Following IGN-OFF, the engine is restarted (IG-NON) (see t2) and an accelerator is fully opened to perform an upshift to the second speed (see t3).

Here, a case in which approximately 10 seconds are required from the downshift to the first speed (see t0) to the upshift to the second speed (see t3) was simulated, but since the clutch temperature falls steadily along a predetermined gradient from t0, it was confirmed that approximately 10 seconds are sufficient for the clutch temperature to decrease reliably to approximately the oil temperature $T_{OIL}$ in an oil pan.

Hence, it has been confirmed through experiment that even when the engine is restarted immediately after being stopped, the clutch temperature falls to approximately the oil temperature $T_{OIL}$, and therefore the oil temperature $T_{OIL}$ can be set as the initial value of the clutch temperature at the time of engine start-up without problems.

After setting the initial value of the clutch temperature in the manner described above, the current temperature calculation unit 101 calculates a clutch temperature Tc using different methods according to the current state of the clutch. More specifically, the thermal load (heat generation amount $T_{up}$) of the clutch differs between an engagement period and a disengagement period and between a shift transition period and a steady period. The thermal load generated in the clutch also differs between a downshift and an upshift. Accordingly, as shown in FIG. 5, the current temperature calculation unit 101 includes a heat generation amount calculation unit 105 that calculates heat generation during engagement and disengagement transition periods of the clutch, and a heat radiation amount calculation unit 106 that calculates heat radiation during engagement and disengagement steady periods. Furthermore, the heat generation amount calculation unit 105 is provided with an engagement transition heat generation amount calculation unit 107 that calculates heat generation during an engagement transition, and a disengagement transition heat generation amount calculation unit 108 that calculates heat radiation during a disengagement transition.

In this embodiment, an "engagement transition" denotes a torque phase or an inertia phase of a clutch to be engaged, and a "disengagement transition" denotes the torque phase or the inertia phase of a clutch to be disengaged. Further, an "engagement steady state" indicates that engagement of a subject clutch is complete and that the clutch is not in the torque phase or the inertia phase, regardless of whether or not a shift command has been issued or whether or not a shift is underway, while a "disengagement steady state" indicates that disengagement of the subject clutch is complete.

Figure 7:
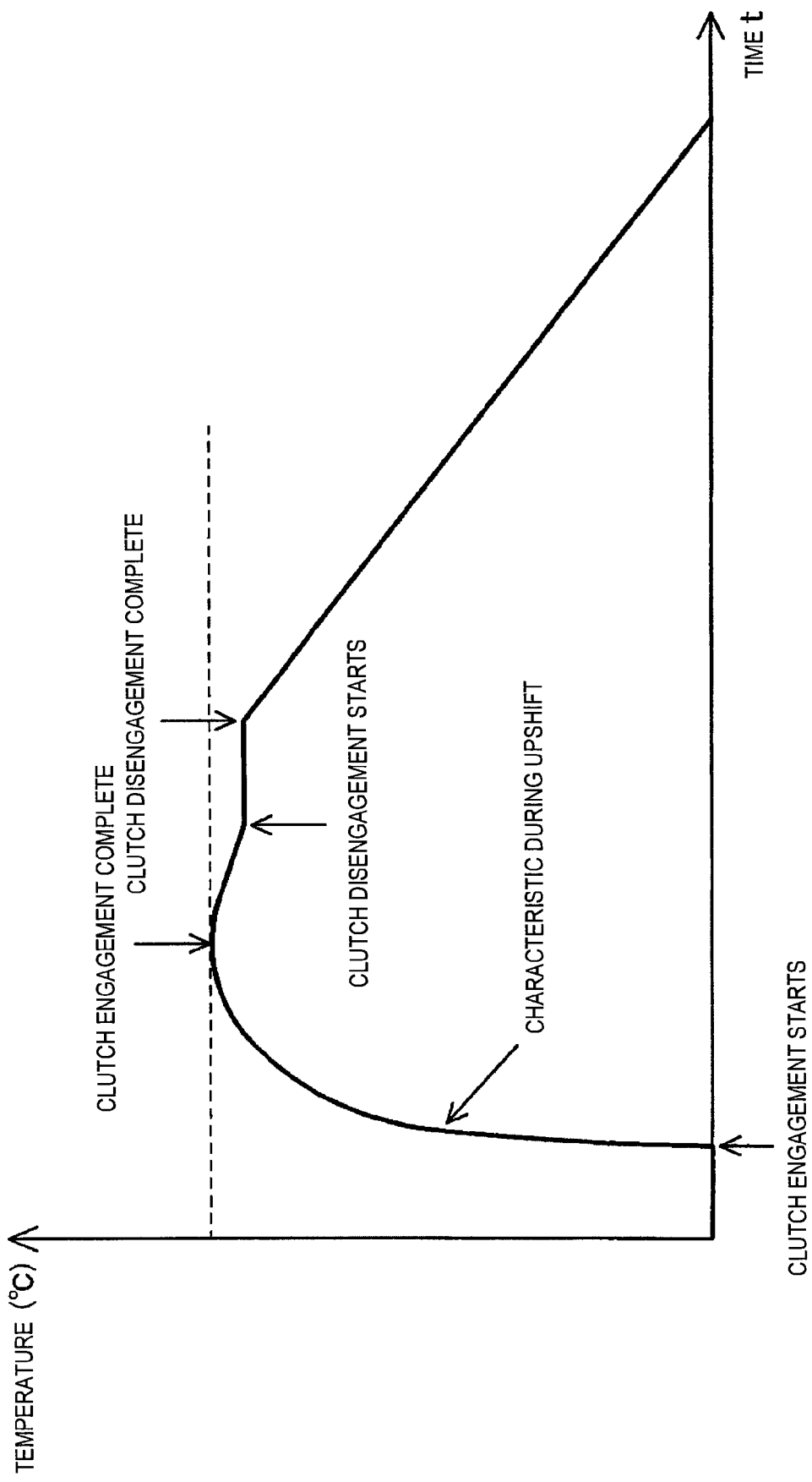
FIG. 7 is a view illustrating a clutch temperature characteristic of the shift control device for the automatic transmission.

FIG. 7 is a view showing a temperature variation characteristic accompanying engagement and disengagement of a clutch during an actual upshift. As shown in the figure, the greatest temperature increase occurs in the period extending from the start of clutch engagement to the end of engagement. Moreover, at this time, the temperature variation gradient is sharpest. When the clutch is engaged and enters a steady state, the temperature thereof falls steadily along a constant gradient. When clutch disengagement begins, the temperature decrease up to that point is canceled out by a temperature increase caused by frictional heat that is generated by relative rotation of the clutch. As a result, the temperature becomes substantially constant such that variation in the clutch temperature is minute (indicated in FIG. 7 as clutch temperature Tc constant).

When disengagement of the clutch is complete (disengagement steady state), the temperature falls along a predetermined gradient. It should be noted that the temperature decrease gradient following clutch disengagement (in the disengagement steady state) is greater (has a larger incline) than the temperature decrease gradient following clutch engagement (in the engagement steady state).

Thus, the current temperature calculation unit 101 calculates the temperature Tc of the clutch taking this temperature variation characteristic into account. To describe calculation of the temperature Tc of the clutch by the current temperature calculation unit 101 specifically, the current gear position, and when a shift is determined the target gear position, are input into the current temperature calculation unit 101 on the basis of information from the shift map 3, together with the turbine rotation speed NT from the turbine rotation speed sensor 12 and the engine rotation speed NE from the engine rotation speed sensor 32.

Of the plurality of clutches, the clutches in the engagement steady state or the disengagement steady state (in other words, all of the clutches when a shift operation is not underway in the transmission 7 or when a shift operation is underway, the clutches that do not contribute to the shift operation, for example the third clutch 19 and the first brake 22 during a 2→3 shift) are in a steady state and not in a state of sliding contact where the clutches have torque capacity. Therefore, frictional heat is not generated in the clutches and the temperature of the clutches does not rise. Hence, the heat radiation amount is calculated by the heat radiation amount calculation unit 106.

Here, the heat radiation amount calculation unit 106 calculates a heat radiation amount (temperature decrease margin) $T_{down}$ on the basis of the following Equations (1) and (2). It should be noted that in accordance with the control of the controller 1, a heat generation amount $T_{up}$ is taken as + and the heat radiation amount $T_{down}$ is taken as −, and therefore, in Equations (1) and (2), the heat radiation amount $T_{down}$<0.

Disengagement state: $T_{down}=A \times t_c (t \leq t1)$,
$T_{down}=-B \times t_c (t1 \leq t)$ (1)

where A is a variable, B is a constant, $t_c$ is an interval, t is an elapsed time following shift completion, and t1 is a predetermined time period.

Engagement state: $T_{down}=C \times t_c (t \leq t1)$,
$T_{down}=-D \times t_c (t1 \leq t)$ (2)

where C is a variable, D is a constant, $t_c$ is an interval, t is an elapsed time following shift completion, and t1 is a predetermined time period.

More specifically, in the heat radiation amount calculation unit 106, the heat radiation amount $T_{down}$ is calculated from the point at which a shift is completed and a steady state is entered to the point at which the predetermined time period t1 elapses under the assumption that the clutch temperature Tc is falling along the variable gradients A, C, and once the predetermined time period t1 has elapsed following shift completion, the heat radiation amount $T_{down}$ is calculated under the assumption that the clutch temperature Tc is falling along the constant gradients B, D. The variables A, C take values determined on the basis of a temperature difference between the current temperature Tc of the clutch and the oil temperature $T_{OIL}$, and are set such that as the temperature difference increases, the gradient becomes sharper. The constant gradients B, D are set at B>D such that the temperature decreases along a sharper gradient during the disengagement steady state, as shown in FIG. 7. The reason for this is that during the disengagement steady state, lubricating oil is supplied to a facing surface of the clutch more easily than during the engagement steady state, and as a result, greater heat radiation can be performed.

A new current clutch temperature Tc is then calculated by adding the calculated heat radiation amount $T_{down}$ to the previously calculated current clutch temperature Tc.

When the clutch is in the engagement or disengagement steady state, the clutch temperature Tc is calculated to fall along a predetermined gradient in accordance with Equations (1) and (2), and therefore, when the subject clutch remains in the steady state for a long time, a realistically impossible value (a lower temperature than the oil temperature $T_{OIL}$, for example), is calculated.

Hence, the heat radiation amount calculation unit 106 is provided with a function for resetting calculation of the heat radiation amount $T_{down}$ in Equations (1) and (2) (or clipping a lower limit value thereof) when the clutch engagement or disengagement steady state continues for a predetermined time period. More specifically, a reset determination timer, not shown in the figures, is provided in the heat radiation amount calculation unit 106, and when the start of the engagement steady state or the disengagement steady state is determined, the timer begins to count.

When the timer count indicates that the clutch has been in the engagement steady state or the disengagement steady state continuously for the predetermined time period, calculation of the clutch temperature Tc based on Equations (1) and (2) is canceled. In this case, the clutch temperature Tc should have fallen sufficiently to be equal to the oil temperature $T_{OIL}$, and therefore the clutch temperature Tc is aligned with the current oil temperature $T_{OIL}$ thereafter.

Further, when the current clutch temperature Tc falls to or below the oil temperature $T_{OIL}$ before the timer count exceeds the predetermined time period, clutch temperature Tc=oil temperature $T_{OIL}$ is set thereafter.

On the other hand, when the state of the clutch shifts to an engagement transition or a disengagement transition within the predetermined time period following the start of the timer count, the timer is reset such that the count returns to its initial value. As a result, the count is begun from the initial value when the clutch reenters a steady state from the transition state.

Figure 8:
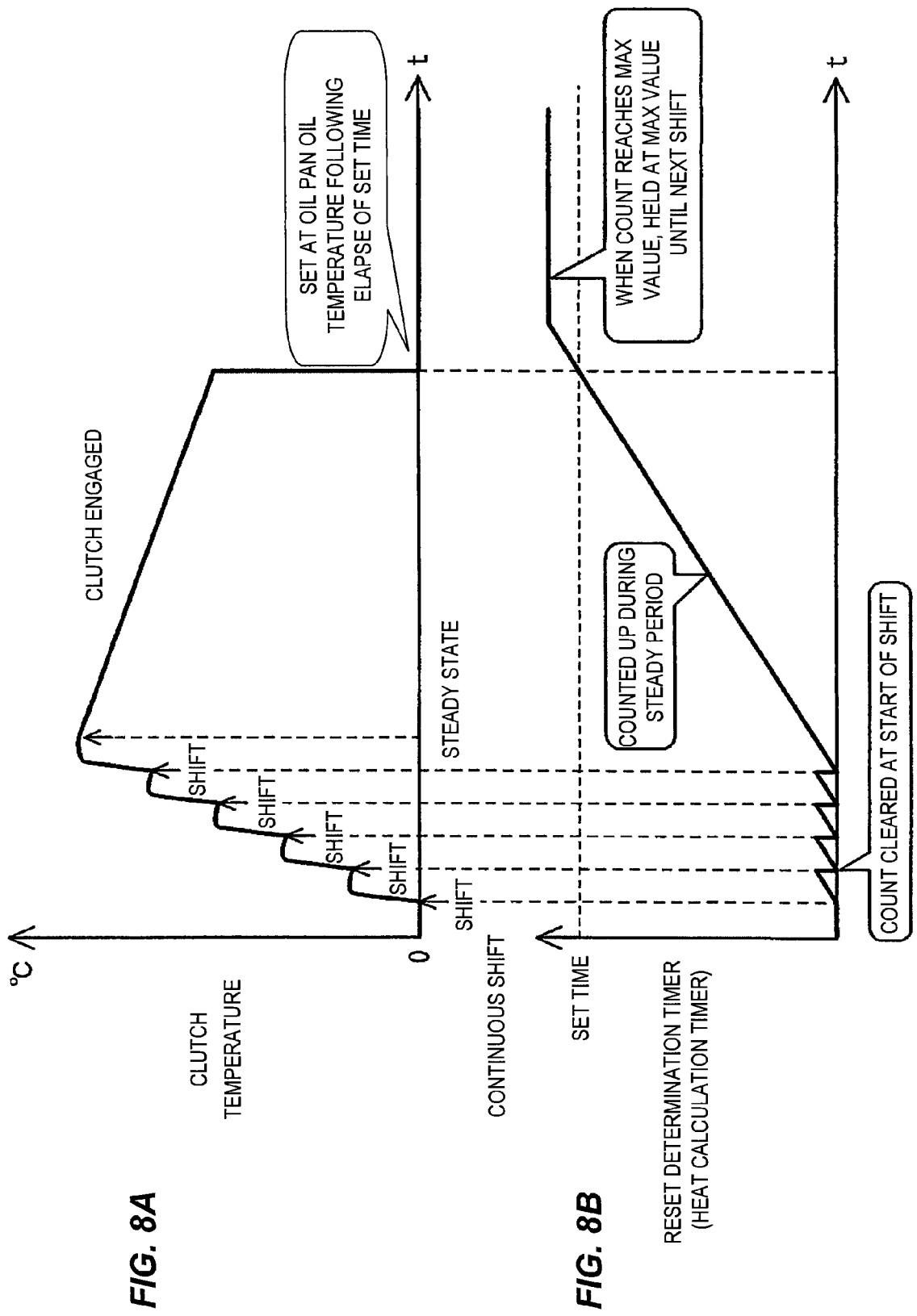
FIGS. 8A, 8B are views illustrating a reset determination timer of the shift control device for the automatic transmission.

Using FIGS. 8A, 8B, an action of the reset determination timer when a continuous shift is performed between an Nth speed and an N+1th speed will now be described. FIG. 8A is a view illustrating variation in the clutch temperature Tc, and FIG. 8B is a view showing the count of the reset determination timer.

As shown in FIG. 8A, when a continuous shift occurs, the clutch temperature Tc rises every time the clutch is engaged. During the engagement steady state or the disengagement steady state of the clutch, the clutch temperature Tc falls, but when a continuous shift is performed within a brief time period, the temperature decrease is smaller than the temperature increase that occurs during the clutch engagement transition.

As shown in FIG. 8B, meanwhile, the timer count is reset every time a shift begins (during a transition), and in this example, the timer count is continued when the clutch shifts to the engagement steady state. When the timer count reaches a predetermined value, it is determined thereafter that the clutch temperature Tc has fallen to the oil temperature $T_{OIL}$, as shown in FIG. 8A, and therefore the clutch temperature Tc is set at the oil pan oil temperature $T_{OIL}$. Further, the timer count is held at a set value or a maximum value, which is set to be larger than the set value.

Next, temperature calculation (heat generation) during an engagement or disengagement transition of the clutch will be described.

In this case, the current temperature of the clutch is calculated as needed by the heat generation amount calculation unit 105. First, when the clutch is determined to be in a transition state on the basis of information from the turbine rotation speed sensor 12 and so on, the heat generation amount calculation unit 105 determines whether the clutch is in the engagement transition state or the disengagement transition state.

When the clutch is determined to be in the engagement transition state (the second clutch 17 during a 2→3 shift, for example), the engagement transition heat generation amount calculation unit 107 provided in the heat generation amount calculation unit 105 calculates the heat generation amount $T_{up}$ of the clutch.

On the basis of information from the shift map 3, the engagement transition heat generation amount calculation unit 107 determines whether the shift that is currently underway is an upshift or a downshift. Here, the heat generation amount during a clutch engagement transition differs greatly between an upshift and a downshift such that the amount of heat generated during an upshift engagement transition is larger than the amount of heat generated during a downshift engagement transition. During a downshift engagement transition, on the other hand, the amount of heat generated by the clutch is small compared with that of an upshift.

The reason for this is that when the disengagement side clutch is disengaged during a downshift, engine rotation increases under its own power such that the engagement side clutch is engaged at a synchronous timing, and therefore, the heat generation amount $T_{up}$ of the engagement side clutch is smaller during a downshift than during an upshift.

Hence, in this embodiment, when an upshift is determined during an engagement transition, the heat generation amount $T_{up}$ of the clutch is calculated on the basis of the following Equation (3), and when a downshift is determined, the heat generation amount $T_{up}$ is set on the basis of the following Equation (4).

$$T_{up}=(\Delta N \times T_{in} \times \Delta t/1000) \times A \Delta \alpha \qquad (3)$$

$$T_{up}=0 \qquad (4)$$

In Equation (3), $\Delta N$ is a relative rotation speed of the clutch, $T_{in}$ is a transmission torque of the clutch, $\Delta t$ is a minute shift period, A is a constant for converting an amount of energy into a temperature, and $\alpha$ is a matching constant (correction coefficient). The relative rotation speed $\Delta N$ of the clutch is calculated on the basis of the turbine rotation speed NT obtained by the turbine rotation speed sensor 12, the output shaft rotation speed No obtained by the output shaft rotation speed sensor 13, and a gear ratio between the gears of the transmission. Further, the transmission torque of the clutch is calculated from the duty values of the solenoid valves corresponding to the respective clutches, or in other words oil pressure values.

Further, even when an engagement transition is underway, the heat generation amount $T_{up}$ during a downshift is small, and therefore, in this embodiment, downshift heat generation amount $T_{up}=0$ is set, as shown in Equation (4). As described above, the reason for this is that when the clutch enters an engagement transition, the temperature decrease (heat radiation) produced by the lubricating oil and the temperature increase produced by the comparatively small heat generation amount cancel each other out, and therefore a substantially constant temperature is obtained.

Thus, during an upshift, the heat generation amount $T_{up}$ is calculated every cycle and integrated throughout the shift, and by adding the clutch temperature Tc calculated during the previous control cycle to the calculated heat generation amount $T_{up}$, the current clutch temperature Tc is calculated. As noted above, the initial value of the clutch temperature Tc is set at the ATF temperature $T_{OIL}$ obtained by the oil temperature sensor 14.

When the clutch is determined to be in the disengagement transition state (the second brake 23 during a 2→3 shift, for example), on the other hand, the heat generation amount $T_{up}$ of the clutch is calculated by the disengagement transition heat generation amount calculation unit 108 provided in the heat generation amount calculation unit 105.

The disengagement transition heat generation amount calculation unit 108 determines on the basis of information from the shift map 3 whether the shift that is currently underway is an upshift or a downshift. Here, the heat generation amount during a clutch disengagement transition differs greatly between an upshift and a downshift such that, in contrast to an engagement transition, the amount of heat generated during a downshift disengagement transition is larger than the amount of heat generated during an upshift disengagement transition. During an upshift disengagement transition, on the other hand, the amount of heat generated by the clutch is small compared with that of a downshift.

When an upshift has been determined, the heat generation amount $T_{up}$ is calculated on the basis of Equation (4), and when a downshift is determined, the heat generation amount $T_{up}$ is calculated on the basis of Equation (3).

Having determined a shift while calculating the current clutch temperature Tc in the manner described above, the controller 1 predicts the temperature increase $T_{INH}$ in the clutch that contributes to the shift upon execution of a subsequent shift from the current temperature state.

Prediction of the temperature increase $T_{INH}$ is executed by the predicted temperature increase calculation unit 102 provided in the controller 1. As shown in FIG. 5, the predicted temperature increase calculation unit 102 comprises an UP shift predicted temperature increase calculation unit 111 that predicts the temperature increase $T_{INH}$ of the clutch during an upshift, a normal DOWN shift predicted temperature increase calculation unit 112 that predicts the temperature increase $T_{INH}$ of the clutch during a normal downshift, a PYDOWN shift predicted temperature increase calculation unit 113 that predicts the temperature increase $T_{INH}$ of the clutch during a PYDOWN shift to be described below, and a second synchronization shift predicted temperature increase calculation unit 114 that predicts the temperature increase $T_{INH}$ of the clutch during a second synchronization shift.

When an upshift or a downshift is determined by the controller 1, the controller 1 predicts the temperature increase $T_{INH}$ before issuing an actual upshift command or downshift command. The calculation methods employed by the respective predicted temperature increase calculation units will be described below.

Once the predicted temperature increase $T_{INH}$ during the next shift has been calculated by the predicted temperature increase calculation unit 102, the predicted temperature increase $T_{INH}$ is input into the predicted temperature calculation unit 103 together with the current clutch temperature Tc calculated by the current temperature calculation unit 101, as shown in FIG. 5.

The predicted temperature calculation unit 103 adds the predicted temperature increase $T_{INH}$ to the current clutch temperature Tc to calculate the predicted temperature $T_{ES}$ upon completion of the next shift.

As shown in FIG. 5, the controller 1 is further provided with a burnout temperature setting unit 110. The burnout temperature setting unit 110 determines the possibility of a driving force deficiency on the basis of the gradient of the traveling road and the vehicle speed, and sets an UP burnout temperature and a DOWN burnout temperature on the basis of the determination result. The UP burnout temperature and DOWN burnout temperature are temperatures at which burnout occurs when the respective burnout temperatures are exceeded by the clutch temperature Tc during an upshift or a downshift. Specific setting methods thereof will be described below.

In the comparison unit 109, the predicted temperature $T_{ES}$ is compared to the UP burnout temperature or the DOWN burnout temperature, and when the predicted temperature $T_{ES}$ is determined to be equal to or greater than the UP burnout temperature or the DOWN burnout temperature, the determined upshift or downshift is prohibited or switched to another shift by the shift prohibiting/switching unit 104. Here, another shift indicates a PYUP shift in relation to an upshift performed in a normal shift mode and a PYDOWN shift in relation to a downshift performed in the normal shift mode. When it is determined that the predicted temperature $T_{ES}$ is lower than the UP burnout temperature or the DOWN burnout temperature, on the other hand, the determined shift is permitted, and an upshift or a downshift is executed in the normal shift mode.

As shown in FIG. 5, the controller 1 also includes a continuous change-mind shift allowable number calculation unit 120. A change-mind is determined when a shift is performed back to an nth speed during a shift from the nth speed to an n+1th speed or an n−1th speed. When a change-mind shift is determined, the continuous change-mind shift allowable number is calculated on the basis of the current clutch temperature Tc without predicting the temperature increase $T_{INH}$ of the clutch.

Next, a current continuous change-mind shift number is compared with the continuous change-mind shift allowable number in the comparison unit 109, and when the current continuous change-mind shift number is determined to be equal to or greater than the continuous change-mind shift allowable number, execution of the determined upshift or downshift is prohibited. When the current continuous change-mind shift number is determined to be smaller than the continuous change-mind shift allowable number, on the other hand, execution of the determined upshift or downshift is permitted.

With the control described above, when the possibility of clutch burnout exists, a subsequent upshift or downshift is prohibited or switched from the normal shift mode to another shift mode, and when it can be determined that the possibility of clutch burnout does not exist, the upshift or downshift is permitted. Thus, shift prohibition and permission can be performed appropriately in accordance with the thermal load state of the clutch.

The aforementioned PYUP shift and PYDOWN shift will now be described. The PYUP shift and the PYDOWN shift are shift modes in which the shift time at a constant input torque is reduced in comparison with the normal upshift and downshift shift modes, leading to a corresponding reduction in the heat generation amount $T_{up}$. Specifically, the reduction in the shift time is achieved by increasing an increase gradient and a decrease gradient of the oil pressure.

It should be noted that in the following description, the term "upshift" is used to describe a switch in gear position to a High side gear position, and the term "UP shift" is used mainly to clarify the difference between an upshift performed in the normal shift mode and an upshift performed in another shift mode (a PYUP shift, for example). Similarly, the term "downshift" is used to describe a switch in gear position to a Low side gear position, and the term "DOWN shift" is used mainly to clarify the difference between a downshift performed in the normal shift mode and a downshift performed in another shift mode (a PYDOWN shift, for example).

Figure 9:
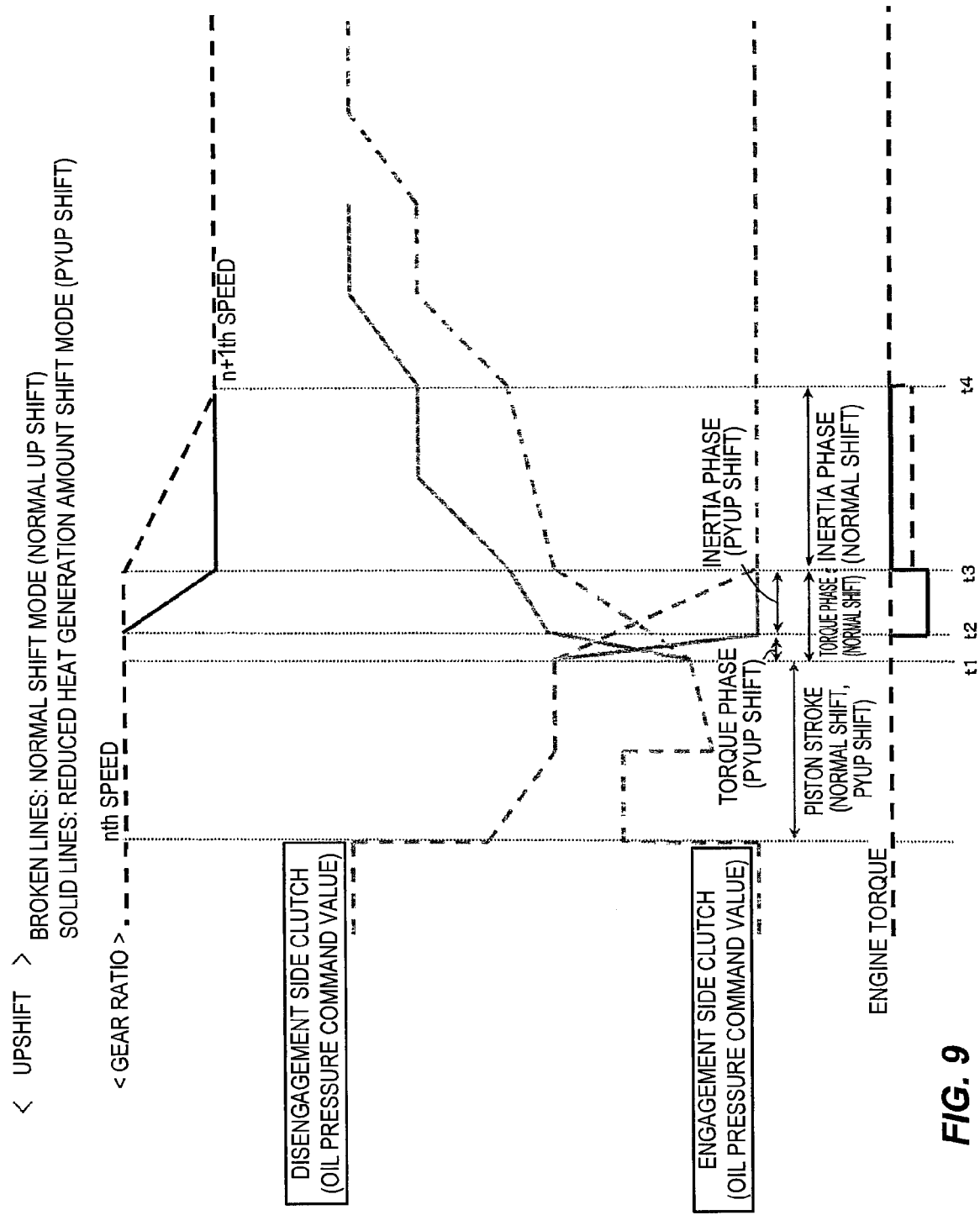
FIG. 9 is a time chart during a PYUP shift.

First, the PYUP shift will be described with reference to FIG. 9. FIG. 9 is a time chart showing variation in the gear ratio, an oil pressure command value of the disengagement side clutch, an oil pressure command value of the engagement side clutch, and the engine torque during a PYUP shift. In FIG. 9, broken lines indicate the normal shift mode (a normal UP shift), and solid lines indicate the reduced heat generation amount shift mode (a PYUP shift).

As shown by the solid lines in FIG. 9, the engagement side clutch is controlled such that the increase gradient of the oil pressure during the torque phase (t1 to t2) and the increase gradient of the oil pressure during the inertia phase (t2 to t3) increase relative to the normal shift mode (a normal UP shift). Further, the disengagement side clutch is controlled such that the decrease gradient of the oil pressure during the torque phase (t1 to t2) increases. The reason for this is that when the engagement side clutch begins to have torque capacity, the disengagement side clutch still has torque capacity, and therefore interlocking may occur.

Hence, the time required for the gear position to shift from the nth speed to the n+1th speed is only t3−t1 during a PYUP shift, as opposed to t4−t1 in the normal shift mode (during a normal UP shift), and therefore a reduction of t4−t3 can be achieved. As a result, the heat generation amount $T_{up}$ of the engagement side clutch is reduced in accordance with this time reduction.

In an upshift, engine torque reduction control is performed during the inertia phase. In a PYUP shift, a torque down amount is set larger, and therefore, even when the engagement side clutch is engaged in a shorter time period during a PYUP shift, an increase in shift shock can be suppressed.

Figure 10:
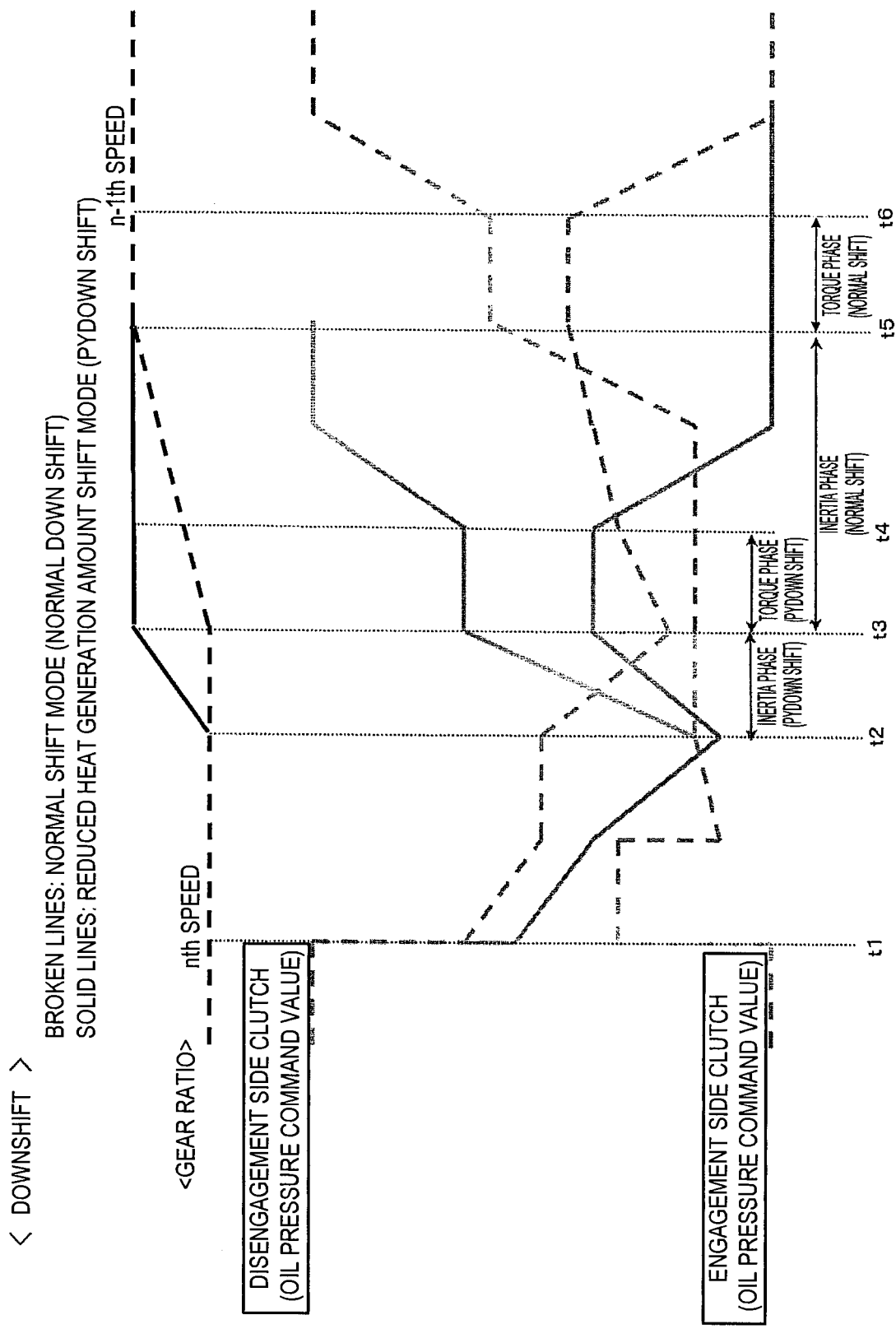
FIG. 10 is a time chart during a PYDOWN shift.

The PYDOWN shift will now be described in a similar manner with reference to FIG. 10. FIG. 10 is a time chart showing variation in the gear ratio, the oil pressure command value of the disengagement side clutch, and the oil pressure command value of the engagement side clutch during a PYDOWN shift. In FIG. 10, broken lines indicate the normal shift mode (a normal DOWN shift), and solid lines indicate the reduced heat generation amount shift mode (a PYDOWN shift).

As shown by the solid lines in FIG. 10, the disengagement side clutch is controlled such that the decrease gradient of the oil pressure from the start of the shift to the start of the inertia phase (t1 to t2) and the increase gradient of the oil pressure during the inertia phase (t2 to t3) increase in comparison with a normal shift. Further, the engagement side clutch is controlled such that the increase gradient of the oil pressure during the inertia phase (t2 to t3) increases.

Hence, the time required for the gear position to shift from the nth speed to the n−1th speed is only t4−t1 during a PYDOWN shift, as opposed to t6−t1 during a normal shift, and therefore a reduction of t6−t4 can be achieved. As a result, the heat generation amount $T_{up}$ of the disengagement side clutch is reduced in accordance with this time reduction.

The control performed by the controller 1, described above with reference to FIG. 5, will now be described in detail using the flowcharts of FIGS. 11 to 21. It should be noted that the flowcharts of FIGS. 11 to 21 are executed in each clutch.

Figure 11:
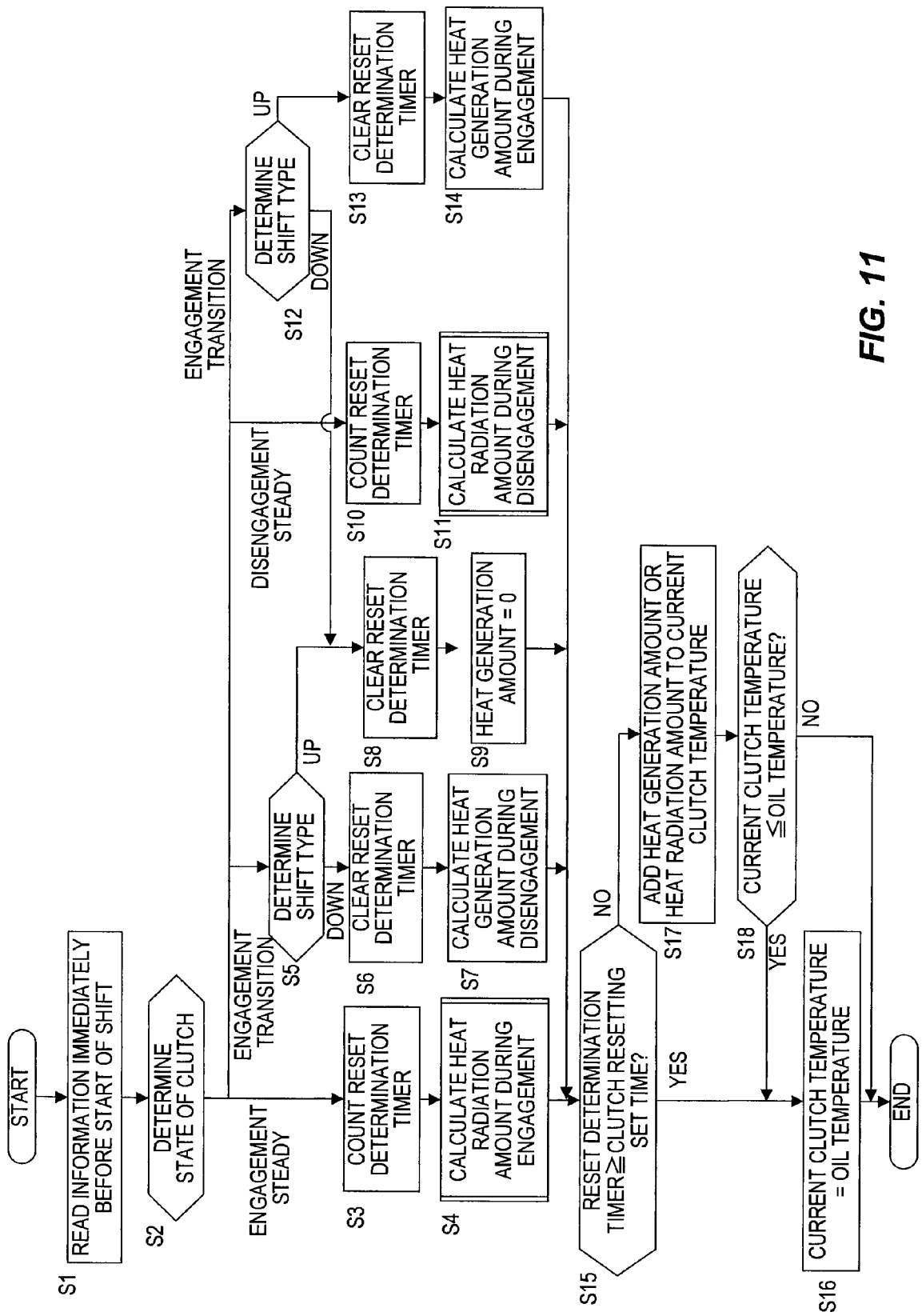
FIG. 11 is a flowchart showing clutch temperature calculation control in the shift control device for the automatic transmission.

First, referring to FIG. 11, the control content of the current temperature calculation unit 101 will be described.

In a step S1, information such as the current engine rotation speed NE, turbine rotation speed NT, oil temperature $T_{OIL}$, and vehicle speed No is read.

In a step S2, a determination is made as to whether the clutch is in the engagement steady state, the disengagement transition state, the disengagement steady state, or the engagement transition state.

When the clutch is in the engagement steady state, the routine advances to a step S3, in which the reset determination timer is counted up, and then advances to a step S4, in which the engagement heat radiation amount $T_{down}$ is calculated. Calculation of the engagement heat radiation amount $T_{down}$ will be described below.

When the clutch is in the disengagement transition state, the routine advances to a step S5, in which a determination is made as to whether the shift type corresponds to an upshift or a downshift. When the shift is a downshift, the routine advances to a step S6, in which the reset determination timer is cleared, and then advances to a step S7, in which the disengagement heat generation amount $T_{up}$ is calculated. The disengagement heat generation amount $T_{up}$ is calculated on the basis of Equation (3). When the shift is an upshift, the routine advances to a step S8, in which the reset determination timer is cleared, and then advances to a step S9, in which the heat generation amount $T_{up}$ is set at 0 on the basis of Equation (4).

When the clutch is in the disengagement steady state, the routine advances to a step S10, in which the reset determination timer is counted up, and then advances to a step S11, in which the disengagement heat radiation amount $T_{down}$ is calculated. Calculation of the disengagement heat radiation amount $T_{down}$ will be described below.

When the clutch is in the engagement transition state, the routine advances to a step S12, in which a determination is made as to whether the shift type corresponds to an upshift or a downshift. When the shift is a downshift, the routine advances to the step S8, in which the reset determination timer is cleared, and then advances to the step S9, in which the heat generation amount $T_{up}$ is set at 0 on the basis of Equation (4). When the shift is an upshift, the routine advances to a step S13, in which the reset determination timer is cleared, and then advances to a step S14, in which the engagement heat generation amount $T_{up}$ is calculated. The engagement heat generation amount $T_{up}$ is calculated on the basis of Equation (3).

In a step S15, a determination is made as to whether or not the reset determination timer has reached or exceeded a clutch resetting set time. When the reset determination timer has reached or exceeded the clutch resetting set time, the routine advances to a step S16, in which the current temperature Tc of the clutch is set at the oil temperature $T_{OIL}$. The processing is then terminated.

When the reset determination timer has not reached the clutch resetting set time, the routine advances to a step S17, in which the heat generation amount $T_{up}$ or the heat radiation amount $T_{down}$ is added to the current temperature Tc of the clutch. It should be noted that the heat radiation amount $T_{down}$ takes a negative value. Here, the clutch resetting set time is a time at which it can be determined that the clutch temperature Tc has fallen sufficiently far to be equal to the oil temperature $T_{OIL}$ due to being in the engagement or disengagement steady state continuously for a predetermined time period.

In a step S18, a determination is made as to whether or not the current clutch temperature Tc is equal to or smaller than the oil temperature $T_{OIL}$. When the current clutch temperature Tc is equal to or smaller than the oil temperature $T_{OIL}$, the routine advances to the step S16, in which the current clutch temperature Tc is set at the oil temperature $T_{OIL}$. When the current clutch temperature Tc is higher than the oil temperature $T_{OIL}$, the processing is terminated. In actuality, the clutch temperature Tc is highly unlikely to fall below the oil temperature $T_{OIL}$, and therefore, when the calculated clutch temperature Tc is lower than the oil temperature $T_{OIL}$, the clutch temperature Tc is set at the oil temperature $T_{OIL}$.

Figure 12:
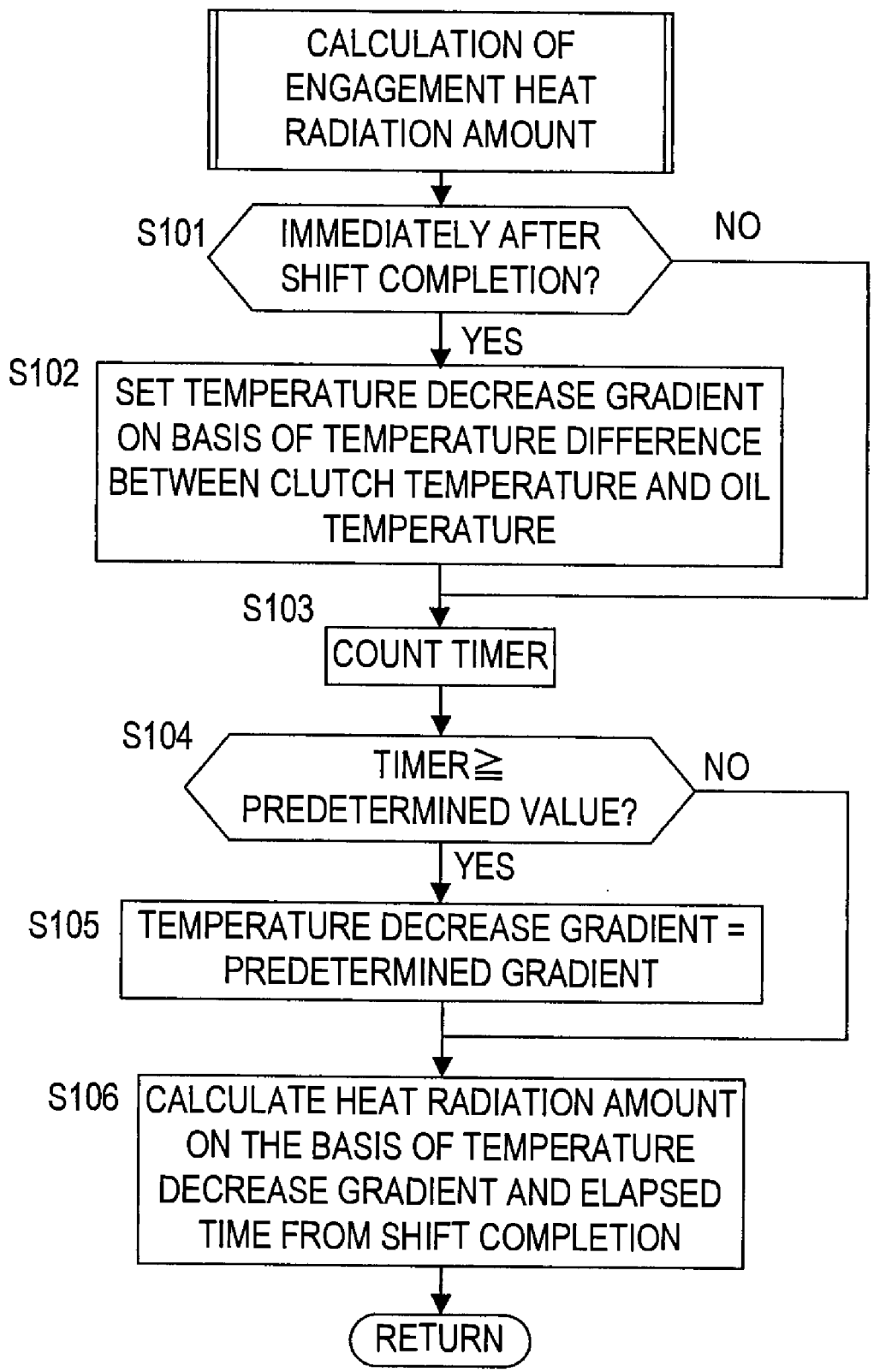
FIG. 12 is a flowchart showing control to calculate an engagement heat radiation amount.

Calculation of the engagement heat radiation amount $T_{down}$ in the step S4 of FIG. 11 will now be described with reference to the flowchart in FIG. 12. It should be noted that the disengagement heat radiation amount $T_{down}$ of the step S11 is calculated using an identical method to the method for calculating the engagement heat radiation amount $T_{down}$, to be described below.

In a step S101, a determination is made as to whether or not a shift has just been completed. When a shift has just been completed, the routine advances to a step S102, and when a shift has not just been completed, the routine advances to a step S103.

In the step S102, a temperature decrease gradient is set on the basis of the temperature difference between the current clutch temperature Tc and the oil temperature $T_{OIL}$. The temperature decrease gradient corresponds to A, C in Equations (1) and (2), and is set to increase as the temperature difference between the current clutch temperature Tc and the oil temperature $T_{OIL}$ increases.

In a step S103, a timer is counted.

In a step S104, a determination is made as to whether or not the timer has reached or exceeded a predetermined value. When the timer has reached or exceeded the predetermined value, the routine advances to a step S105, in which the temperature decrease gradient is set at a predetermined gradient (a constant value).

In a step S106, the current engagement heat radiation amount $T_{down}$ is calculated from the elapsed time following the start of the shift (the value of the timer) and the temperature decrease gradient, whereupon the processing is terminated. Here, the predetermined value corresponds to t1 in Equations (1) and (2), and is set at 5 seconds, for example, which is the time required for the temperature decrease gradient to become substantially constant, irrespective of the temperature at the start of heat radiation.

Next, referring to FIGS. 13 and 14, the control content of the predicted temperature increase calculation unit 102, predicted temperature calculation unit 103, burnout temperature setting unit 110, continuous change-mind shift allowable number calculation unit 115, comparison unit 109, and shift prohibiting/switching unit 104 will be described.

In a step S21, a determination is made as to whether or not a shift has been determined. When a shift has been determined, the routine advances to a step S22, and when a shift has not been determined, the processing is terminated.

In the step S22, the UP burnout temperature and the DOWN burnout temperature are set. A setting method will be described in detail below.

In a step S23, a determination is made as to whether or not the determined shift type corresponds to a change-mind. When the shift is a change-mind, the routine advances to a S60, and when the shift is not a change-mind, the routine advances to a step S24. A change-mind is determined when a shift is performed back to the nth speed during a shift from the nth speed to the n+1th speed or the n–1th speed.

In the step S24, a determination is made as to whether the shift is an upshift or a downshift. When the shift is an upshift, the routine advances to a step S25, and when the shift is a downshift, the routine advances to a step S34. Here, an upshift denotes only an upshift in the engagement transition state, and a downshift denotes only a downshift in the disengagement transition state.

In the step S25, an UP shift predicted temperature increase $T_{INH}$ is calculated. The UP shift predicted temperature increase is the predicted temperature increase of the clutch to be engaged during an upshift. A calculation method will be described in detail below.

In a step S26, an UP shift predicted temperature increase $T_{INH}$ is added to the current clutch temperature Tc to determine the UP shift predicted temperature $T_{ES}$.

In a step S27, a determination is made as to whether or not the UP shift predicted temperature $T_{ES}$ is equal to or greater than the UP burnout temperature, or in other words whether or not the UP shift predicted temperature $T_{ES}$ is within a temperature region equal to or greater than the UP burnout temperature. When the UP shift predicted temperature $T_{ES}$ is lower than the UP burnout temperature, the routine advances to a step S28, in which an UP shift is performed in the normal shift mode, and when the UP shift predicted temperature $T_{ES}$ is equal to or greater than the UP burnout temperature, the routine advances to a step S29.

In the step S29, a PYUP shift predicted temperature increase $T_{INH}$ is calculated. A PYUP shift is a shift mode in which an increase rate of the oil pressure supplied to the clutch is increased in comparison with an UP shift performed in the normal shift mode to reduce the time required to engage the clutch and thereby reduce the heat generation amount of the clutch. The PYUP shift predicted temperature increase $T_{INH}$ is the predicted temperature increase of the clutch to be engaged during a PYUP shift. A PYUP shift differs from a normal UP shift in the target time of the torque phase and the oil pressure gradient at the start of the inertia phase, and therefore the PYUP shift predicted temperature increase $T_{INH}$ is calculated using a similar calculation method to that of the UP shift predicted temperature increase $T_{INH}$. It should be noted that during a PYUP shift, the torque down amount of the engine is set to be larger than that of a normal UP shift in order to suppress increases in shift shock and further reduce the heat generation amount $T_{up}$ of the clutch.

In a step S30, a PYUP shift predicted temperature $T_{ES}$ is determined by adding the PYUP shift predicted temperature increase $T_{INH}$ to the current clutch temperature Tc.

In a step S31, a determination is made as to whether or not the PYUP shift predicted temperature $T_{ES}$ is equal to or greater than the UP burnout temperature, or in other words whether or not the PYUP shift predicted temperature $T_{ES}$ is within a temperature region equal to or greater than the UP burnout temperature. When the PYUP shift predicted temperature $T_{ES}$ is lower than the UP burnout temperature, the routine advances to a step S32, in which a PYUP shift is performed, and when the PYUP shift predicted temperature $T_{ES}$ is equal to or greater than the UP burnout temperature, the routine advances to a step S33, in which execution of the determined upshift is prohibited.

When the shift is determined to be a downshift in the step S24, on the other hand, the routine advances to a step S34. In the step S34, a determination is made as to whether or not the downshift is a downshift generated by accelerator depression. When the downshift is a downshift generated by accelerator depression, the routine advances to a step S44, and when the downshift is not a downshift generated by accelerator depression, the routine advances to a step S35.

In the step S35, a normal DOWN shift predicted temperature increase $T_{INH}$ is calculated. The normal DOWN shift predicted temperature increase $T_{INH}$ is the predicted temperature increase of the clutch to be disengaged during a normal downshift. A calculation method will be described in detail below.

In a step S36, a normal DOWN shift predicted temperature $T_{ES}$ is determined by adding the normal DOWN shift predicted temperature increase $T_{INH}$ to the current clutch temperature Tc.

In a step S37, a determination is made as to whether or not the normal DOWN shift predicted temperature $T_{ES}$ is equal to or greater than the DOWN burnout temperature, or in other words whether or not the normal DOWN shift predicted temperature $T_{ES}$ is within a temperature region equal to or greater than the DOWN burnout temperature. When the normal DOWN shift predicted temperature $T_{ES}$ is lower than the DOWN burnout temperature, the routine advances to a step S38, in which a normal DOWN shift is performed, and when the normal DOWN shift predicted temperature $T_{ES}$ is equal to or greater than the DOWN burnout temperature, the routine advances to a step S39.

In the step S39, a PYDOWN shift predicted temperature increase $T_{INH}$ is calculated. The PYDOWN shift predicted temperature increase is the predicted temperature increase of the clutch to be disengaged during a PYDOWN shift. A calculation method will be described in detail below. A PYDOWN shift is a shift mode in which the time required to disengage the corresponding clutch is reduced by increasing the decrease rate of the oil pressure supplied to the clutch in comparison with a normal DOWN shift, i.e. the normal shift mode.

In a step S40, a PYDOWN shift predicted temperature $T_{ES}$ is determined by adding the PYDOWN shift predicted temperature increase $T_{INH}$ to the current clutch temperature Tc.

In a step S41, a determination is made as to whether or not the PYDOWN shift predicted temperature $T_{ES}$ is equal to or greater than the DOWN burnout temperature, or in other words whether or not the PYDOWN shift predicted temperature $T_{ES}$ is within a temperature region equal to or greater than the DOWN burnout temperature. When the PYDOWN shift predicted temperature $T_{ES}$ is lower than the DOWN burnout temperature, the routine advances to a step S42, in which a PYDOWN shift is performed, and when the PYDOWN shift predicted temperature $T_{ES}$ is equal to or greater than the DOWN burnout temperature, the routine advances to a step S43, in which execution of the determined downshift is prohibited.

When a downshift generated by accelerator depression is determined in the step S34, on the other hand, the routine advances to the step S44. In the step S44, a determination is made as to whether or not an accelerator depression prior to the determination of a shift in the step S21 is equal to or smaller than a predetermined depression and whether or not a variation speed of the accelerator depression is equal to or greater than a predetermined speed. When these conditions are satisfied, the routine advances to a step S50, and when either one of these conditions is not satisfied, the routine advances to a step S45. The predetermined depression is set at substantially zero, and the predetermined speed is set at a value at which rapid depression of an accelerator pedal can be determined. In other words, these conditions are established when the accelerator pedal is depressed rapidly from a substantially fully a released state. In this case, first synchronization control is performed, and therefore the routine advances to the step S50. When the conditions are not established, second synchronization control is performed, and therefore the routine advances to the step S45.

The first synchronization control and the second synchronization control are control methods for engaging the clutch to be engaged during a downshift after synchronizing the engine rotation speed and the rotation speed of the clutch. In the first synchronization control, the disengagement side clutch is disengaged rapidly without being dragged. In other words, the oil pressure supplied to the clutch is reduced in a stepped fashion. On the other hand, the second synchronization control is performed with the aim of eliminating a sense of torque loss in the output torque, and differs from the first synchronization control in that the clutch is disengaged while being dragged. In other words, the oil pressure supplied to the clutch is reduced gradually.

In the step S45, a second synchronization shift predicted temperature increase $T_{INH}$ is calculated. The second synchronization shift predicted temperature increase $T_{INH}$ is the predicted temperature increase $T_{INH}$ of the clutch to be disengaged during a shift performed in accordance with the second synchronization control. A calculation method will be described in detail below.

In a step S46, a second synchronization shift predicted temperature $T_{ES}$ is determined by adding the second synchronization shift predicted temperature increase $T_{INH}$ to the current clutch temperature Tc.

In a step S47, a determination is made as to whether or not the second synchronization shift predicted temperature $T_{ES}$ is equal to or greater than the DOWN burnout temperature. When the second synchronization shift predicted temperature $T_{ES}$ is lower than the DOWN burnout temperature, the routine advances to a step S48, in which a shift is performed in accordance with the second synchronization control, and when the second synchronization shift predicted temperature $T_{ES}$ is equal to or greater than the DOWN burnout temperature, the routine advances to a step S49, in which the determined downshift is prohibited.

On the other hand, when it is determined in the step S44 that the accelerator depression prior to the determination of a shift command is equal to or lower than the predetermined depression and the variation speed of the accelerator depression is equal to or greater than the predetermined speed, the routine advances to the step S50, in which the current clutch temperature Tc is read.

In a step S51, a determination is made as to whether or not the current clutch temperature Tc is equal to or greater than the DOWN burnout temperature. When the current clutch temperature Tc is lower than the DOWN burnout temperature, the routine advances to a step S52, in which a shift is performed in accordance with the first synchronization control. When the current clutch temperature Tc is equal to or greater than the DOWN burnout temperature, the routine advances to a step S53, in which the downshift is prohibited.

Figure 14:
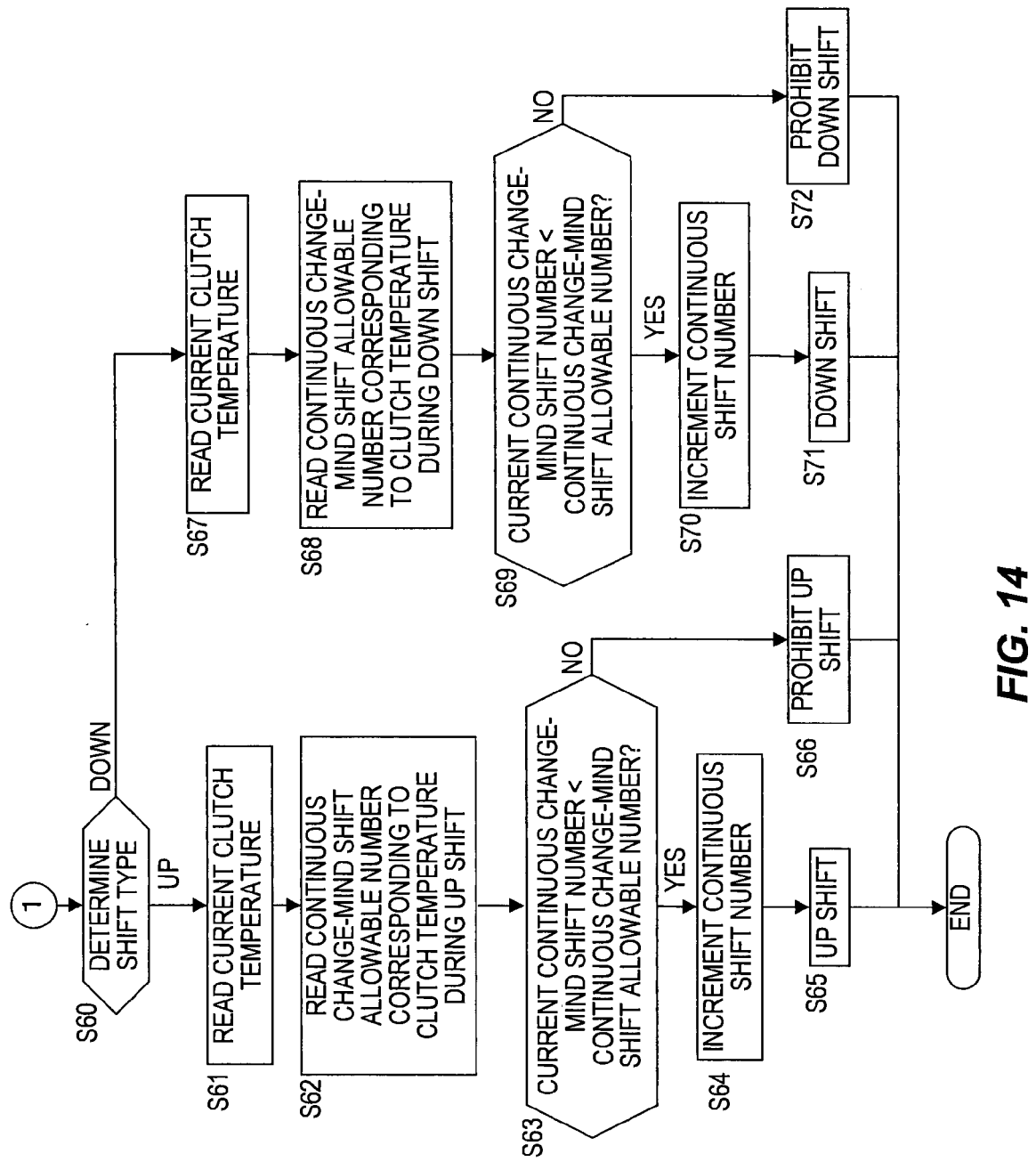
FIG. 14 is a flowchart showing shift control in the shift control device for the automatic transmission.

When a change-mind is determined in the step S23, on the other hand, the routine advances to a step S60 of FIG. 14, in which a determination is made as to whether or not the shift type corresponds to an upshift or a downshift. When the shift is determined to be an upshift, the routine advances to a step S61, and when the shift is determined to be a downshift, the routine advances to a step S67. In the step S60, similarly to the step S24, an upshift denotes only an upshift in the engagement transition state, and a downshift denotes only a downshift in the disengagement transition state.

In the step S61, the current clutch temperature Tc is read.

In a step S62, the continuous change-mind shift allowable number corresponding to the clutch temperature Tc during an UP shift is read. The continuous change-mind shift allowable number is determined on the basis of the clutch temperature Tc by referring to a map shown in FIG. 15.

Figure 15:
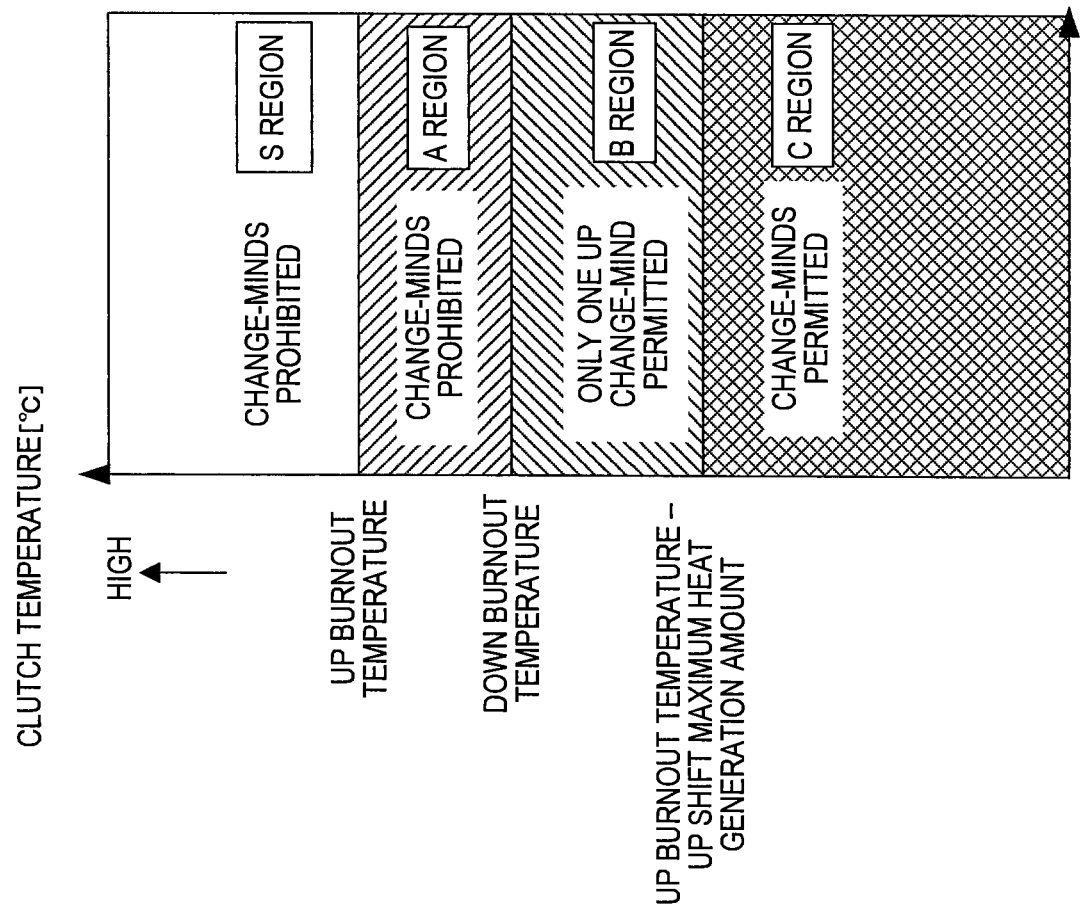
FIG. 15 is a map showing an allowable number of continuous change-mind shifts.

The map in FIG. 15 is divided into four regions, namely an S region, an A region, a B region and a C region, in accordance with the clutch temperature Tc, and the continuous change-mind shift allowable number is determined according to the region of the current clutch temperature Tc. In the S region, the clutch temperature Tc is equal to or higher than the UP burnout temperature. In the A region, the clutch temperature Tc is lower than the UP burnout temperature and equal to or higher than the DOWN burnout temperature. In the B region, the clutch temperature Tc is lower than the DOWN burnout temperature and equal to or greater than a temperature obtained by subtracting a maximum heat generation amount $T_{up}$ during an upshift from the UP burnout temperature. In the C region, the clutch temperature Tc is lower than the temperature obtained by subtracting the maximum heat generation amount $T_{up}$ during an upshift from the UP burnout temperature.

When the current clutch temperature Tc is in the S region, clutch burnout occurs, and therefore change-minds are prohibited and the continuous change-mind shift allowable number if set at 0. When the current clutch temperature Tc is in the A region, there is a possibility that the clutch temperature Tc will enter the S region following even a single change-mind, and therefore change-minds are prohibited and the continuous change-mind shift allowable number is set at 0. When the current clutch temperature Tc is in the B region, this means that even if a downshift occurs after a change-mind upshift performed during a downshift, the downshift can be restricted, and therefore the continuous change-mind shift allowable number is set at 1. When the current clutch temperature Tc is in the C region, there is no need to restrict change-minds. Here, however, the continuous change-mind shift allowable number is set at 5, for example.

Returning to FIG. 14, a determination is made in a step S63 as to whether or not the current continuous change-mind shift number is smaller than the continuous change-mind shift allowable number. When the current continuous change-mind shift number is smaller than the continuous change-mind shift allowable number, the routine advances to a step S64, in which the continuous shift number is incremented, and then advances to a step S65, in which an upshift is performed. When the current continuous change-mind shift number is equal to or greater than the continuous change-mind shift allowable number, the routine advances to a step S66, in which the upshift is prohibited.

When the shift is determined to be a downshift in the step S60, on the other hand, the routine advances to the step S67, in which the current clutch temperature Tc is read.

In a step S68, the continuous change-mind shift allowable number corresponding to the clutch temperature Tc during a downshift is read. The continuous change-mind shift allowable number during a downshift is determined similarly to the continuous change-mind shift allowable number during an upshift determined in the step S62. It should be noted, however, that a case in which the clutch temperature Tc is in the B region differs from a corresponding case during an upshift. When a downshift change-mind is performed during an upshift, an upshift may be then performed forcibly to prevent over-revving of the engine, and therefore, in consideration of this upshift, the change-mind is prohibited.

In a step S69, a determination is made as to whether or not the current continuous change-mind shift number is smaller than the continuous change-mind shift allowable number. When the current continuous change-mind shift number is smaller than the continuous change-mind shift allowable number, the routine advances to a step S70, in which the continuous shift number is incremented, and then advances to a step S71, in which a downshift is performed. When the current continuous change-mind shift number is equal to or greater than the continuous change-mind shift allowable number, the routine advances to a step S72, in which the downshift is prohibited.

Figure 16:
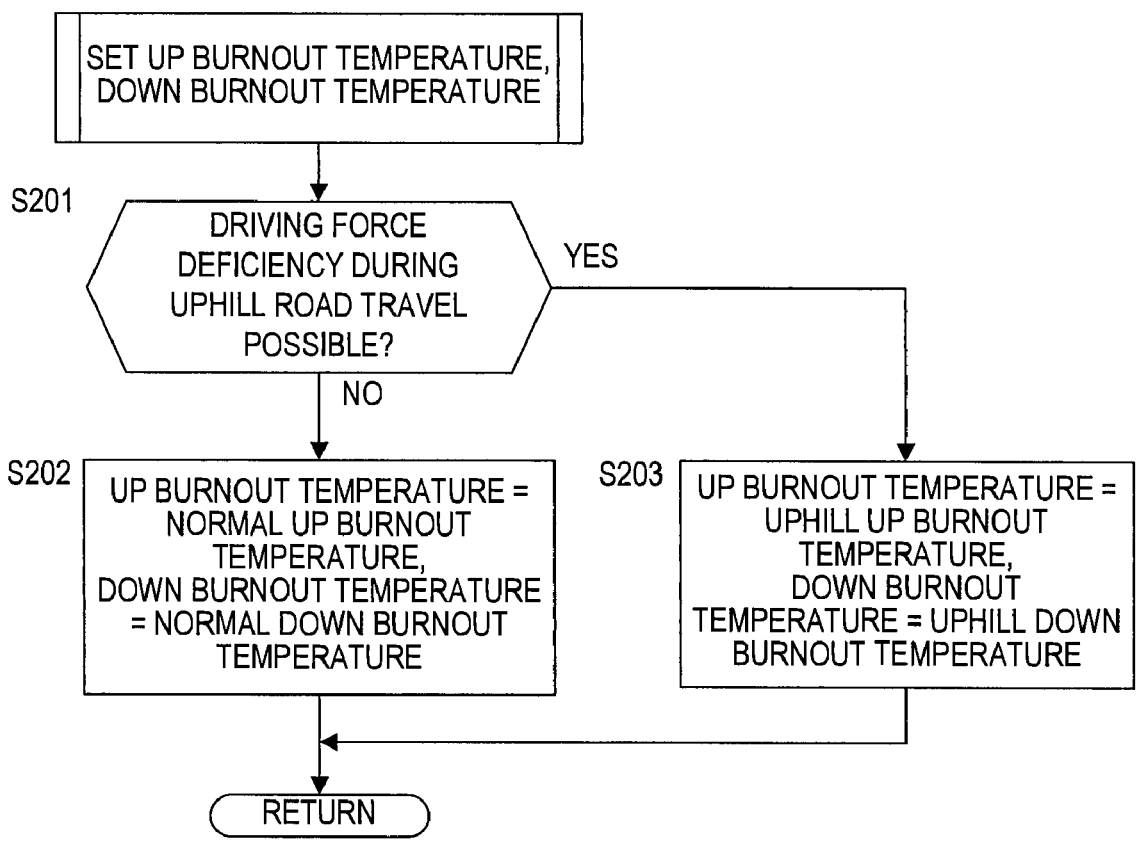
FIG. 16 is a flowchart showing control to set an UP burnout temperature and a DOWN burnout temperature.

Next, setting of the UP burnout temperature and the DOWN burnout temperature in the step S22 of FIG. 13 will be described with reference to the flowchart shown in FIG. 16.

Figure 17:
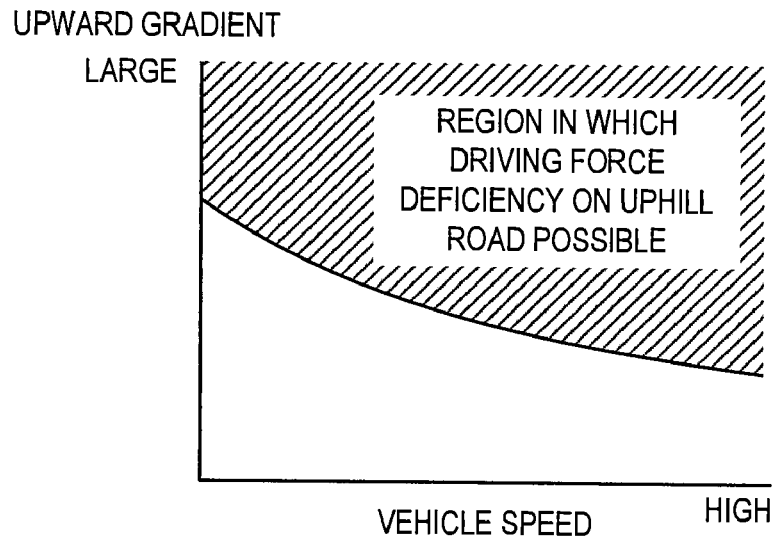
FIG. 17 is a map for determining the possibility of a driving force deficiency during travel on an uphill road.

In a step S201, the possibility of a driving force deficiency in the vehicle due to travel along an uphill road is determined on the basis of the upward gradient of the traveling road and the vehicle speed by referring to a map shown in FIG. 17. According to the map shown in FIG. 17, a driving force deficiency becomes more likely as the upward gradient of the traveling road increases and as the vehicle speed increases.

Here, a "driving force deficiency" indicates a condition in which the driving force of the vehicle is insufficient relative to the travel resistance (a sum total of rolling resistance, air resistance, and grade resistance) of the vehicle (a condition in which the intended acceleration of the driver cannot be realized) or a condition in which the driving force of the vehicle is smaller than the travel resistance (a condition in which the current vehicle speed cannot be maintained such that the vehicle decelerates).

When it is determined that there is no possibility of a driving force deficiency due to uphill road travel, the routine advances to a step S202, in which the UP burnout temperature is set at a normal UP burnout temperature (first predetermined value) and the DOWN burnout temperature is set at a normal DOWN burnout temperature (second predetermined value). The normal UP burnout temperature is set at a higher temperature than the normal DOWN burnout temperature.

When it is determined that the possibility of a driving force deficiency due to uphill road travel exists, on the other hand, the routine advances to a step S203, in which the UP burnout temperature is set at an uphill UP burnout temperature (fourth predetermined value) and the DOWN burnout temperature is set at an uphill DOWN burnout temperature (third predetermined value). The uphill DOWN burnout temperature is set at a higher temperature than the normal DOWN burnout temperature, while the uphill UP burnout temperature is set at a lower temperature than the uphill DOWN burnout temperature.

It should be noted that in addition to the method described above, a driving deficiency may be determined by calculating the driving force of the vehicle from the torque of the engine 1, the gear ratio of the automatic transmission 7, and a final reduction ratio, calculating the travel resistance from the vehicle speed, the gradient, the vehicle weight, the frictional coefficient of the tires, the total projected area of the vehicle, and so on, and then comparing the calculated driving force of the vehicle to the travel resistance.

Figure 18:
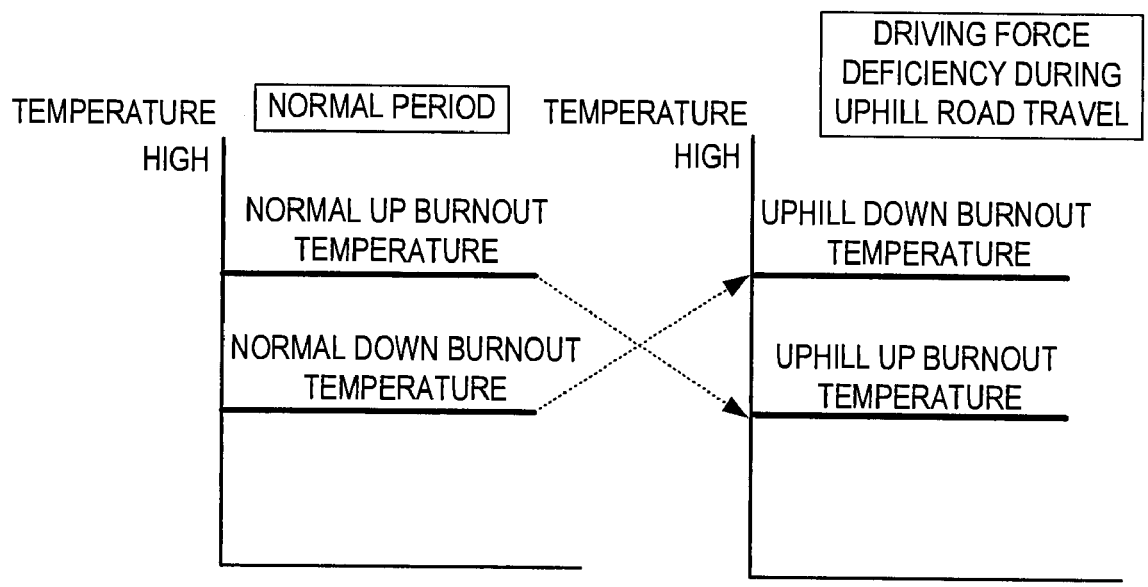
FIG. 18 is a view illustrating the UP burnout temperature and the DOWN burnout temperature.

FIG. 18 shows a relationship between the normal UP and DOWN burnout temperatures and the uphill UP and DOWN burnout temperatures. In a normal period, the UP burnout temperature (=normal UP burnout temperature) is set to be higher than the DOWN burnout temperature (=normal DOWN burnout temperature), but when it is determined that the possibility of a driving force deficiency due to uphill road travel exists, this relationship is reversed such that the UP burnout temperature (=uphill UP burnout temperature) is set to be lower than the DOWN burnout temperature (=uphill DOWN burnout temperature). The UP burnout temperature and DOWN burnout temperature are set in this manner such that when the possibility of a driving force deficiency due to uphill road travel exists, upshifts are prohibited and more downshifts are permitted, thereby preventing the driving force deficiency.

Figure 19:
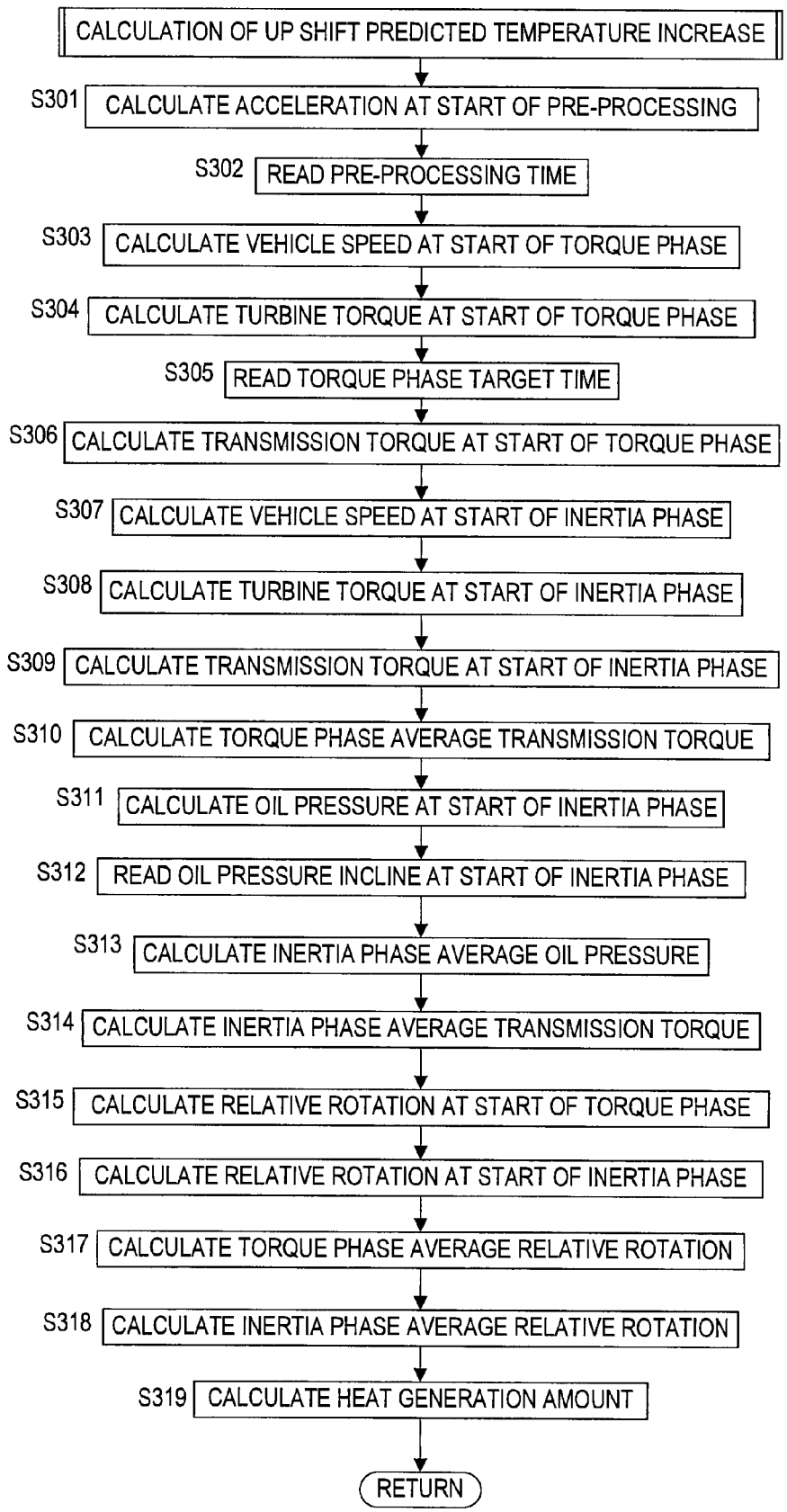
FIG. 19 is a flowchart showing control to calculate a predicted temperature during an UP shift.
Figure 22:
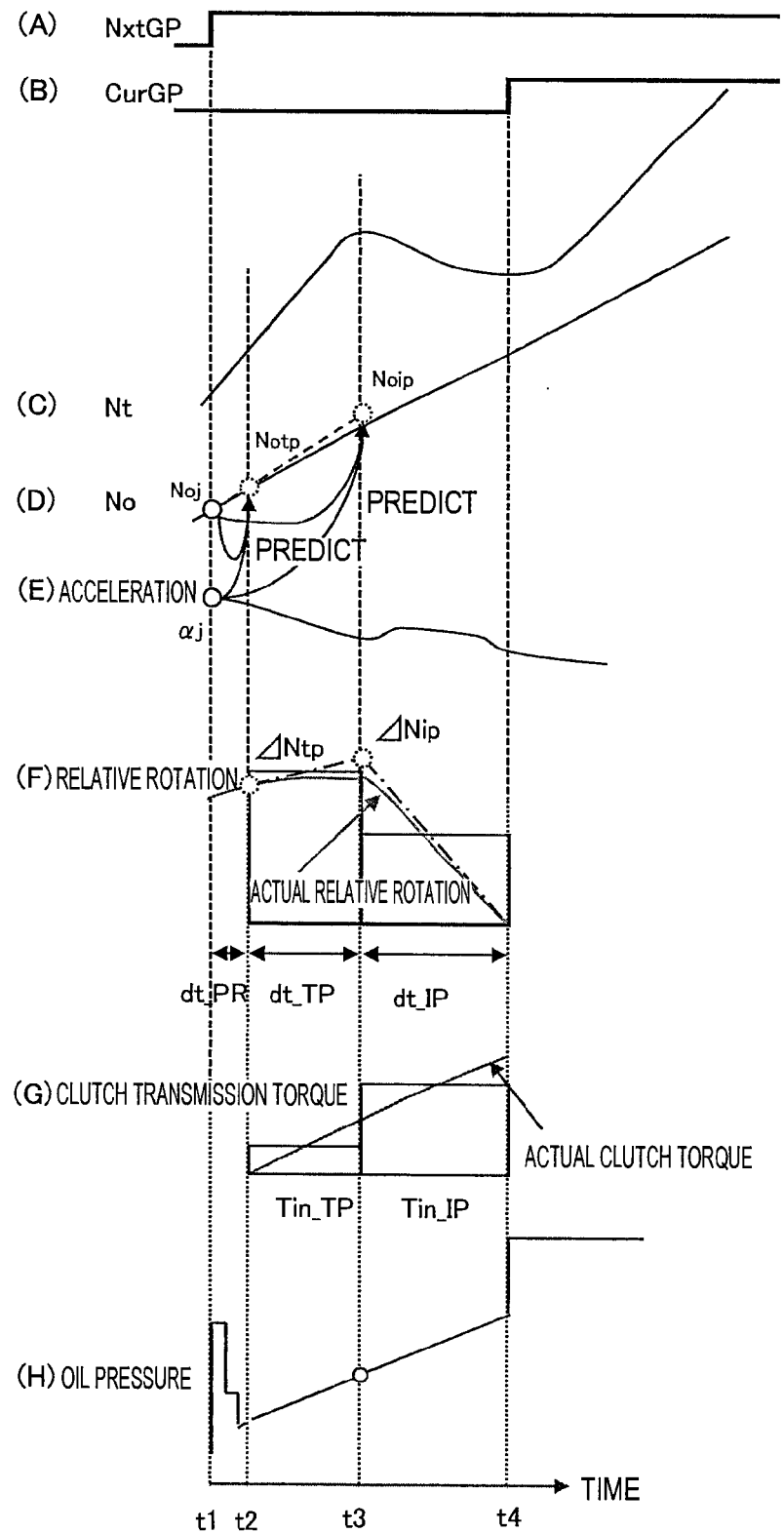
FIG. 22 is a time chart during an UP shift.

Next, calculation of the UP shift predicted temperature increase $T_{INH}$ in the step S25 of FIG. 13 will be described with reference to the flowchart shown in FIG. 19 and the time chart shown in FIG. 22. The time chart shown in FIG. 22 shows variation in A: a target gear position NxtGP, B: a current gear position CurGP, C: the turbine rotation speed NT, D: the output rotation speed No (vehicle speed), E: acceleration, F: relative rotation speed, G: the transmission torque of the clutch, and H: the oil pressure supplied to the clutch. A pre-processing time is indicated by t1 to t2, a torque phase target time is indicated by t2 to t3, and an inertia phase target time is indicated by t3 to t4. The pre-processing time extends from issuance of a shift command to completion of a piston stroke of the clutch.

In a step S301, the acceleration at the start of the pre-processing (FIG. 22E; t1) is calculated. The acceleration at the start of the pre-processing is calculated on the basis of the vehicle speed at the start of the pre-processing and the vehicle speed at a predetermined previous time.

In a step S302, the pre-processing time (t2−t1) is read. The pre-processing time is determined on the basis of the vehicle speed and the torque, and in this embodiment, a pre-processing time backup timer provided for the shift control is read.

In a step S303, the vehicle speed at the start of the torque phase (FIG. 22D; t2) is calculated. The vehicle speed at the start of the torque phase is calculated by adding a value obtained by multiplying the pre-processing time by the acceleration at the start of the pre-processing to the vehicle speed at the start of the pre-processing.

In a step S304, the turbine torque at the start of the torque phase is calculated. The turbine torque at the start of the torque phase is calculated by determining the turbine rotation speed NT from the vehicle speed and the gear ratio at the start of the torque phase, and then referring to a pre-stored rotation-torque conversion map on the basis of the turbine rotation speed NT.

In a step S305, the torque phase target time (t3−t2) of the shift control is read on the basis of the vehicle speed and the turbine torque at the start of the torque phase.

In a step S306, the transmission torque at the start of the torque phase (FIG. 22G; t2) is calculated. The transmission torque at the start of the torque phase counterbalances the return spring of the clutch, and since no oil pressure is supplied at the start of the torque phase, the transmission torque at the start of the torque phase is zero.

In a step S307, the vehicle speed at the start of the inertia phase (FIG. 22D; t3) is calculated. The vehicle speed at the start of the inertia phase is calculated by adding the vehicle speed at the start of the torque phase to a value obtained by multiplying the torque phase target time to the acceleration at the start of the pre-processing.

In a step S308, the turbine torque at the start of the inertia phase is calculated. The turbine torque at the start of the inertia phase is calculated by determining the turbine rotation speed NT from the vehicle speed and the gear ratio at the start of the inertia phase, and then referring to the rotation-torque conversion map on the basis of the turbine rotation speed NT.

In a step S309, the transmission torque at the start of the inertia phase (FIG. 22G; t3) is calculated. The transmission torque at the start of the inertia phase is calculated by multiplying an burden share ratio by the turbine torque at the start of the inertia phase. The burden share ratio is a ratio between the torque of each of the plurality of clutches that are engaged in a certain gear position and the input torque.

In a step S310, a torque phase average transmission torque (FIG. 22G) is calculated. The torque phase average transmission torque is calculated by halving a value obtained by adding the transmission torque at the start of the inertia phase to the transmission torque at the start of the torque phase. In other words, the torque phase average transmission torque is calculated as an average value of the transmission torque at the start of the torque phase and the transmission torque at the start of the inertia phase.

In a step S311, the oil pressure at the start of the inertia phase (FIG. 22H; t2) is calculated. The oil pressure at the start of the inertia phase is calculated on the basis of the following equation (5).

$$\text{(Oil pressure at start of inertia phase)} = \text{(transmission torque at start of inertia phase)}/(A \times \mu \times D \times N) + F/A \quad (5)$$

Here, A is a surface area, μ is a frictional coefficient, D is an effective diameter, N is a number of facings, and F is the load of the return spring.

In a step S312, an oil pressure incline at the start of the inertia phase is read from a shift control map on the basis of the turbine torque at the start of the inertia phase and the vehicle speed at the start of the inertia phase.

In a step S313, an inertia phase average oil pressure is calculated. The inertia phase average oil pressure is calculated on the basis of the oil pressure at the start of the inertia phase, the oil pressure incline at the start of the inertia phase, and the inertia phase target time. It should be noted that the inertia phase target time is a constant.

In a step S314, an inertia phase average transmission torque (FIG. 22G) is calculated on the basis of the inertia phase average oil pressure.

In a step S315, the relative rotation speed at the start of the torque phase (FIG. 22F; t2) is calculated. The relative rotation speed at the start of the torque phase is calculated in accordance with the following Equation (6).

$$\text{(Relative rotation speed at start of torque phase)} = \{A \times \text{(output rotation speed } No \text{ at start of torque phase)} + B \times \text{(turbine rotation speed } NT \text{ at start of torque phase)}\} \times 2\pi/60 \quad (6)$$

Here, A and B are relative rotation calculation constants that are determined in advance from a lever analogy diagram.

In a step S316, the relative rotation speed at the start of the inertia phase (FIG. 22F; t3) is calculated. The relative rotation speed at the start of the inertia phase is calculated in accordance with the following Equation (7).

$$\text{(Relative rotation speed at start of inertia phase)} = \{A \times \text{(output rotation speed } No \text{ at start of inertia phase)} + B \times \text{(turbine rotation speed } NT \text{ at start of inertia phase)}\} \times 2\pi/60 \quad (7)$$

In a step S317, a torque phase average relative rotation speed (FIG. 22F) is calculated. The torque phase average relative rotation speed is calculated by halving a value obtained by adding the relative rotation speed at the start of the inertia phase to the relative rotation speed at the start of the torque phase. In other words, the torque phase average relative rotation speed is calculated as an average value of the relative rotation speed at the start of the torque phase and the relative rotation speed at the start of the inertia phase.

In a step S318, an inertia phase average relative rotation speed (FIG. 22F) is calculated. The inertia phase average relative rotation speed is calculated by halving the relative rotation speed at the start of the inertia phase. At the end of the inertia phase, the relative rotation speed reaches zero, and therefore, by halving the relative rotation speed at the start of the inertia phase, an average value of the relative rotation speed at the start and end of the inertia phase is obtained.

In a step S319, the heat generation amount $T_{up}$ is calculated. The heat generation amount $T_{up}$ is calculated in accordance with the following Equation (8).

$$\text{(Heat generation amount } T_{up}) = \{\text{(torque phase time)} \times \text{(torque phase average relative rotation speed)} \times \text{(torque phase average transmission torque)} + \text{(inertia phase time)} \times \text{(inertia phase average relative rotation speed)} \times \text{(inertia phase average transmission torque)}\}/1000 \times (Q-T \text{ conversion coefficient}) \quad (8)$$

Here, the time, relative rotation speed, and torque are multiplied to obtain units of [J], and therefore the Q−T conversion coefficient is a coefficient for converting [J] into [° C.]. During unit conversion, the coefficient is applied after changing [J] to [kJ], and therefore division by 1000 is applied in advance.

Figure 20:
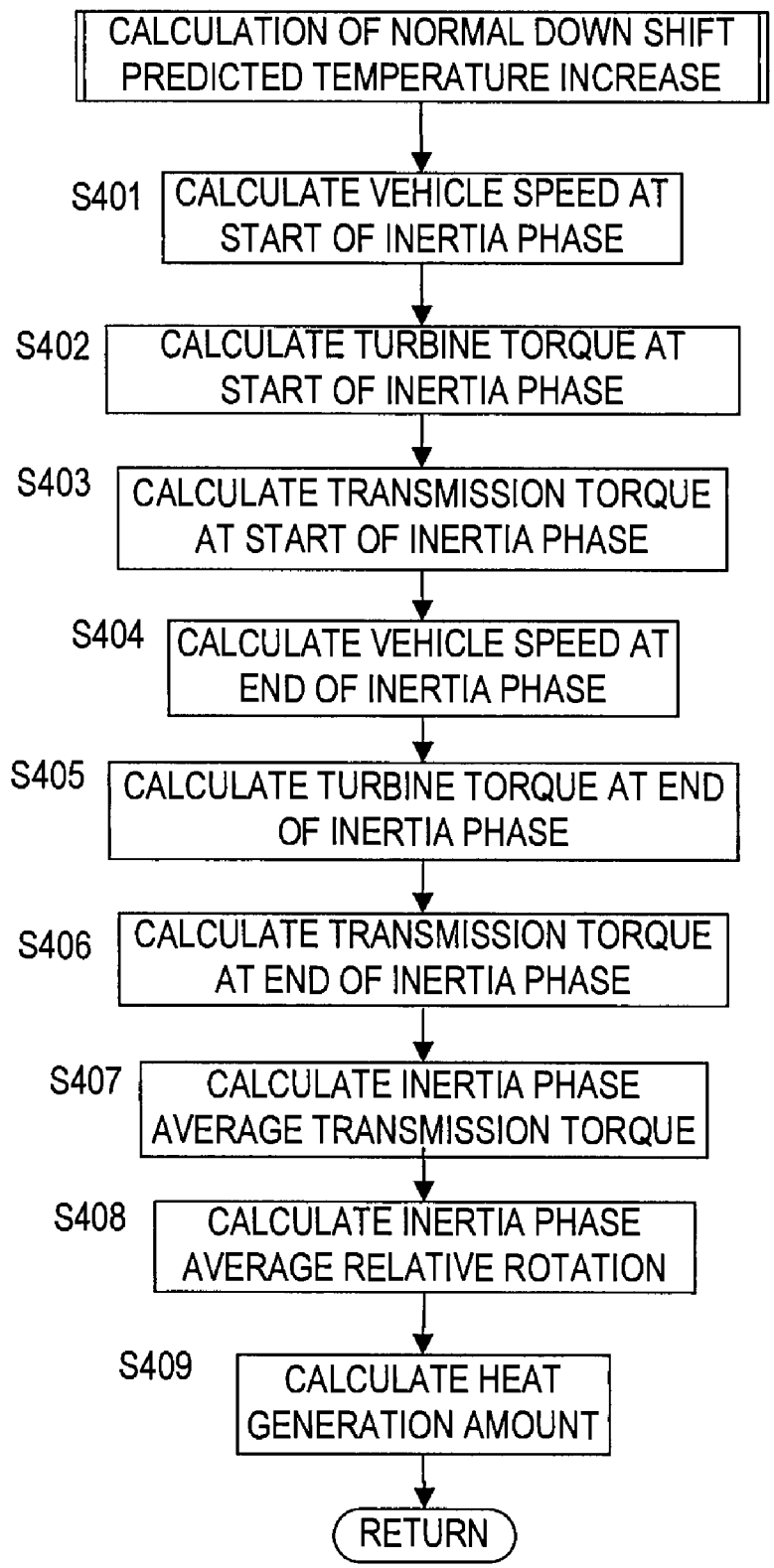
FIG. 20 is a flowchart showing control to calculate a predicted temperature during a normal DOWN shift.
Figure 23:
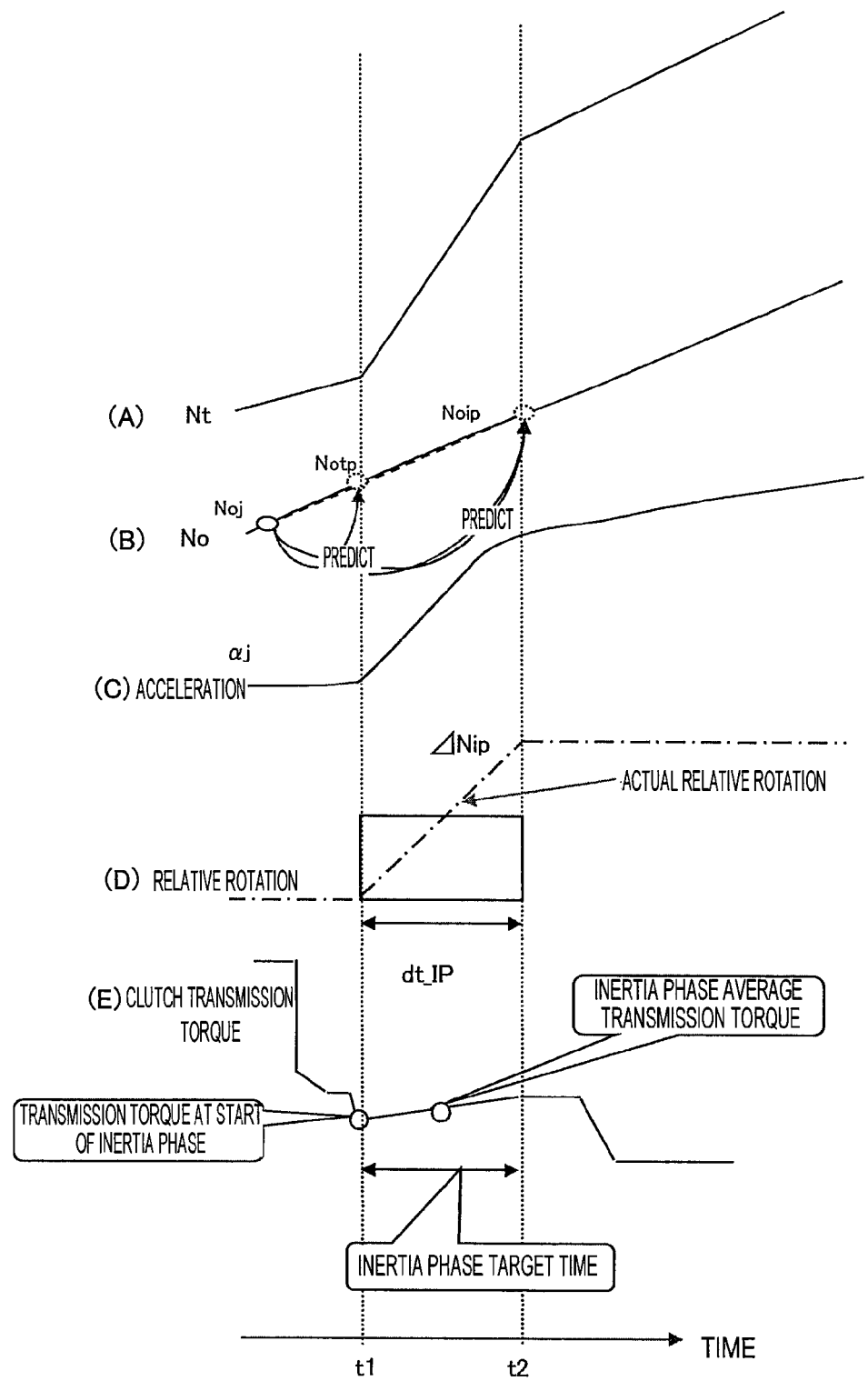
FIG. 23 is a time chart during a DOWN shift.

Calculation of the normal DOWN shift predicted temperature increase $T_{INH}$ in the step S35 of FIG. 13 will now be described with reference to the flowchart shown in FIG. 20 and the time chart shown in FIG. 23. The time chart of FIG. 23 shows variation in A: the turbine rotation speed NT, B: the output rotation speed No (vehicle speed), C: the acceleration, D: the relative rotation speed, and E: the transmission torque of the clutch. The inertia phase target time is indicated by t1 to t2.

In a step S401, the vehicle speed at the start of the inertia phase (FIG. 23B; t1) is calculated. The vehicle speed at the start of the inertia phase is calculated by adding a value obtained by multiplying the pre-processing time by the acceleration at the start of the pre-processing to the vehicle speed at the start of the pre-processing.

In a step S402, the turbine torque at the start of the inertia phase is calculated by determining the turbine rotation speed NT from the vehicle speed and the gear ratio at the start of the inertia phase, and then referring to the rotation-torque conversion map on the basis of the turbine rotation speed NT.

In a step S403, the transmission torque at the start of the inertia phase (FIG. 23E; t1) is calculated. The transmission torque at the start of the inertia phase is calculated by multiplying the burden share ratio by the turbine torque at the start of the inertia phase.

In a step S404, the vehicle speed at the end of the inertia phase (FIG. 23B; t2) is calculated. The vehicle speed at the end of the inertia phase is calculated on the basis of the current acceleration, the pre-processing time, and the inertia phase target time.

In a step S405, the turbine torque at the end of the inertia phase is calculated. The turbine torque at the end of the inertia phase is calculated by determining the turbine rotation speed NT from the vehicle speed and the gear ratio at the end of the inertia phase, and then referring to the rotation-torque conversion map on the basis of the turbine rotation speed NT.

In a step S406, the transmission torque at the end of the inertia phase (FIG. 23E; t2) is calculated. The transmission torque at the end of the inertia phase is calculated by multiplying the burden share ratio and a safety factor by the turbine torque at the end of the inertia phase. The safety factor is a constant for determining the oil pressure when the clutch is disengaged during a downshift, and is determined on the basis of the turbine torque at the end of the inertia phase and the vehicle speed.

In a step S407, the inertia phase average transmission torque (FIG. 23E) is calculated. The inertia phase average transmission torque is calculated by halving a value obtained by adding the transmission torque at the end of the inertia phase to the transmission torque at the start of the inertia phase. In other words, the inertia phase average transmission torque is calculated as an average value of the transmission torque at the start of the inertia phase and the transmission torque at the end of the inertia phase.

In a step S408, the inertia phase average relative rotation speed (FIG. 23D) is calculated. The inertia phase average relative rotation speed is calculated in accordance with the following Equation (9).

(Inertia phase average relative rotation speed)={$A$×
(output rotation speed $No$ at start of inertia
phase)+$B$×(turbine rotation speed $NT$ at start of
inertia phase)}×π/60   (9)

Here, A and B are relative rotation calculation constants that are determined in advance from a lever analogy diagram.

In a step S409, the heat generation amount $T_{up}$ is calculated. The heat generation amount $T_{up}$ is calculated in accordance with the following Equation (10).

(Heat generation amount $T_{up}$)={(inertia phase time)×
(inertia phase average relative rotation speed)×
(inertia phase average transmission torque)}/
1000×($Q$-$T$ conversion coefficient)   (10)

Figure 13:
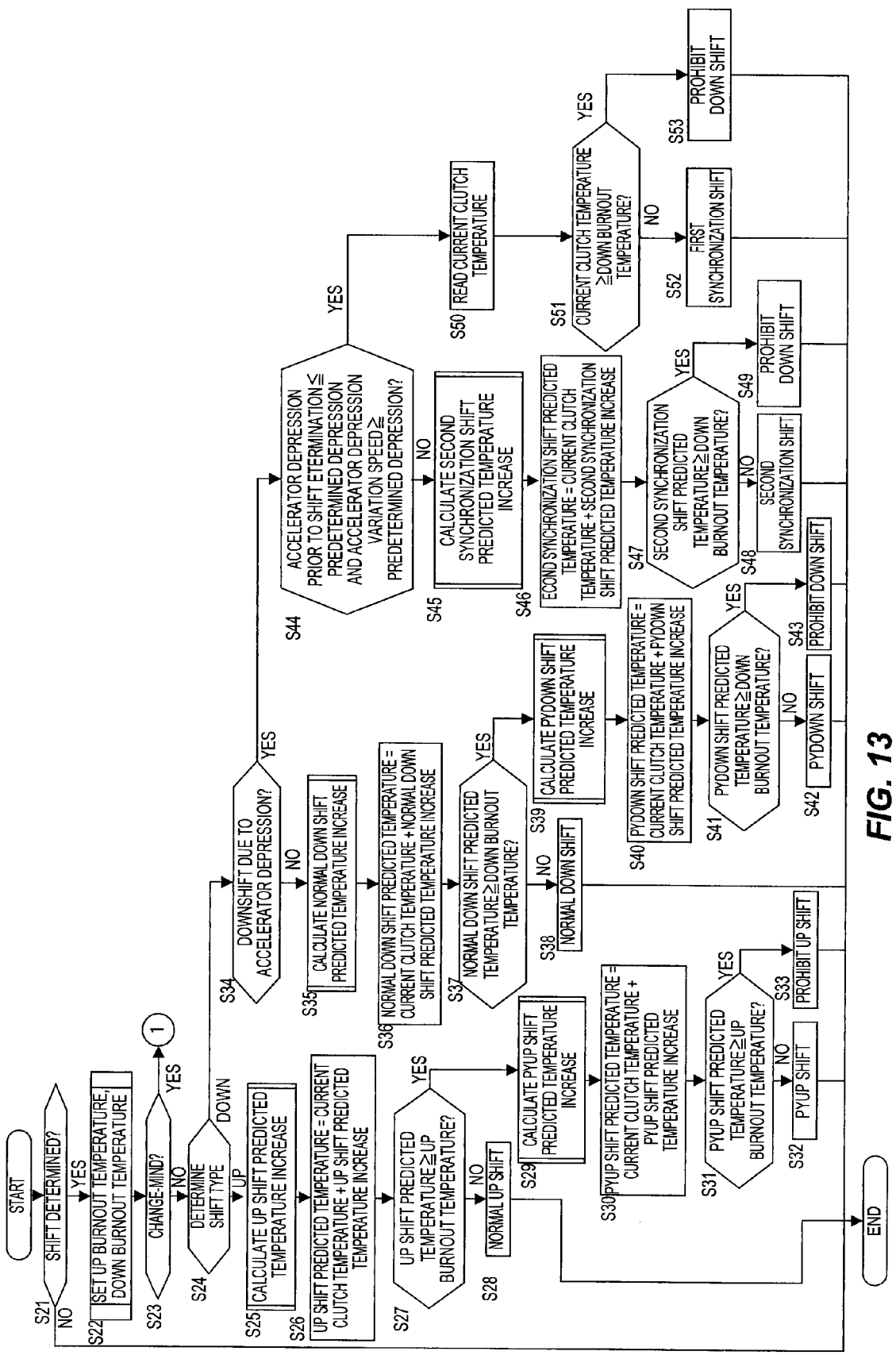
FIG. 13 is a flowchart showing shift control in the shift control device for the automatic transmission.

Calculation of the PYDOWN shift predicted temperature increase $T_{INH}$ in the step S39 of FIG. 13 is performed similarly to calculation of the normal DOWN shift predicted temperature increase $T_{INH}$ described above, differing only in that the inertia phase target time used in the step S404 is shorter than that of a normal DOWN shift.

Figure 21:
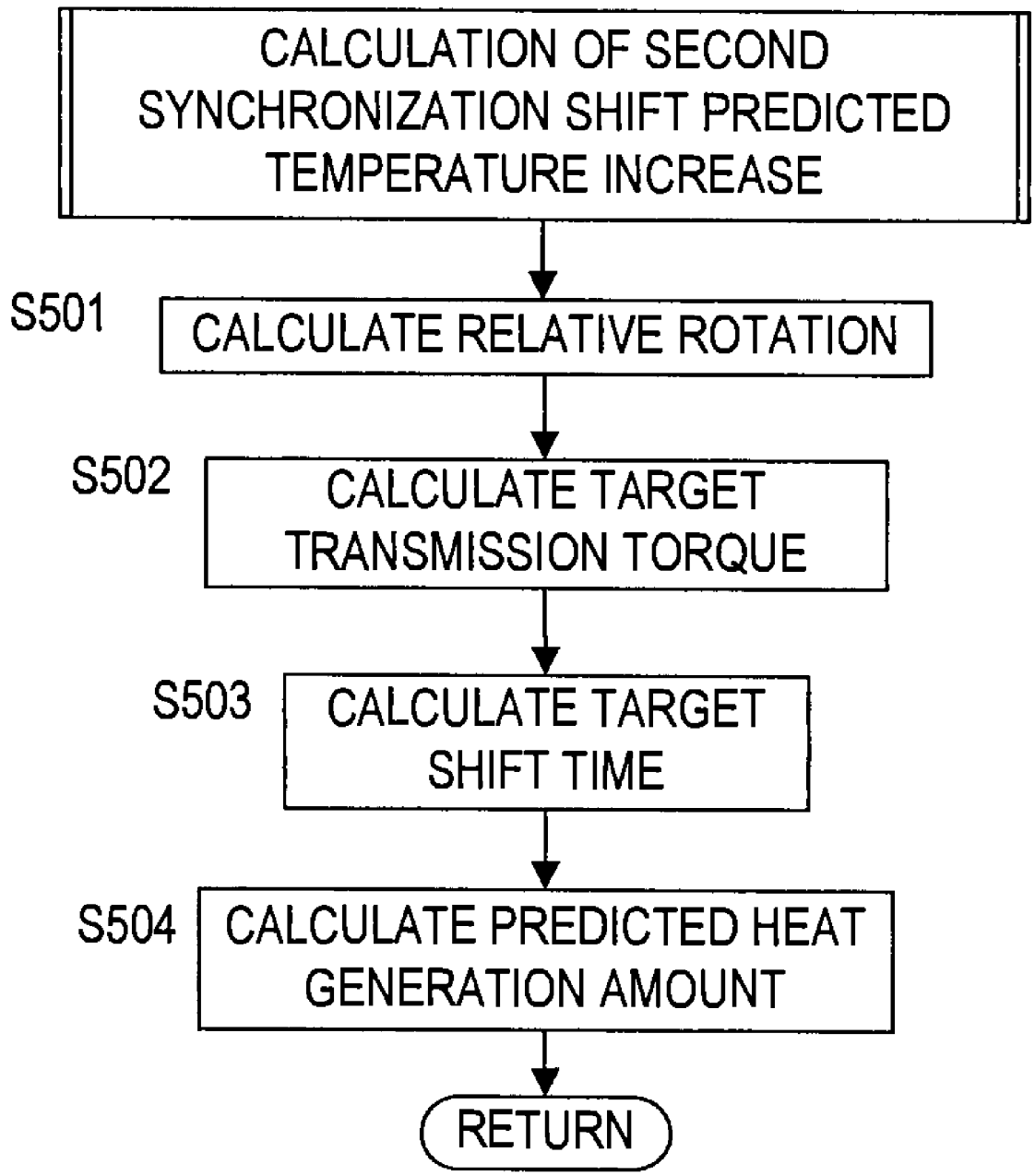
FIG. 21 is a flowchart showing control to calculate a predicted temperature during a second synchronization shift.

Next, calculation of the second synchronization shift predicted temperature increase $T_{INH}$ in the step S45 of FIG. 13 will be described with reference to the flowchart in FIG. 21.

In a step S501, a relative rotation speed between the turbine rotation speed NT and the output rotation speed No is calculated.

In a step S502, a target transmission torque of the clutch to be disengaged is calculated.

In a step S503, a target shift time is calculated.

In a step S504, a predicted heat generation amount $T_{up}$ is calculated. The predicted heat generation amount $T_{up}$ is calculated by multiplying the relative rotation speed, the target transmission torque, and the target shift time.

Figure 24:
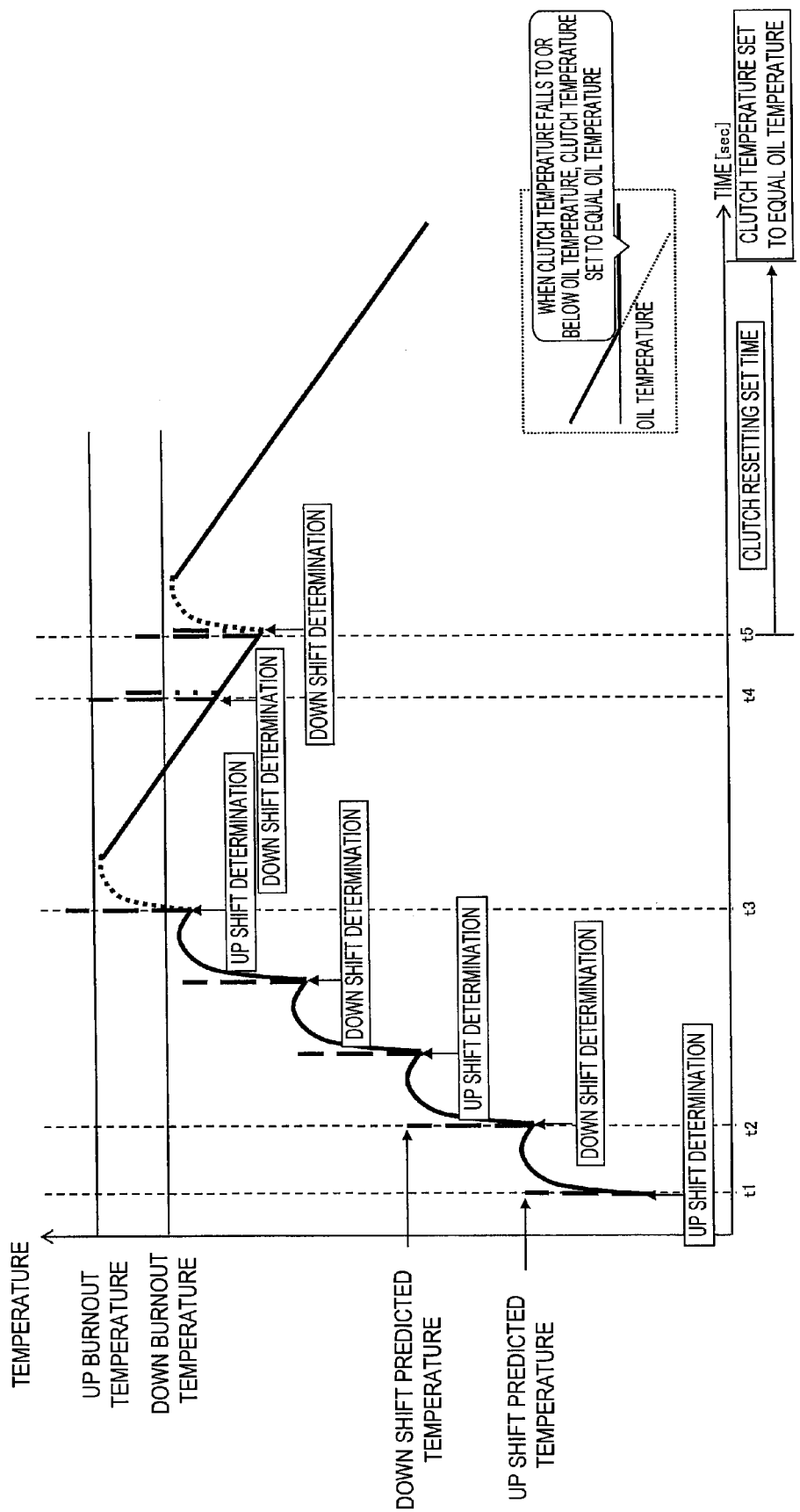
FIG. 24 is a time chart showing actions of the shift control device for the automatic transmission.

Next, actions of the shift control device for an automatic transmission according to this embodiment will be described with reference to the time chart shown in FIG. 24. Unless indicated otherwise, the terms "upshift" and "downshift" are used to indicate shifts performed in the normal shift mode, emphasizing shift shock. FIG. 24 is a time chart showing variation in the temperature of a certain clutch in a state where upshifts and downshifts are performed repeatedly between the nth speed and the n+1th speed, after which heat radiation occurs.

When an UP shift command is issued at a time t1, the UP shift predicted temperature increase $T_{INH}$ is calculated, and since the predicted temperature $T_{ES}$ following an UP shift, which is obtained by adding the UP shift predicted temperature increase $T_{INH}$ to the current clutch temperature Tc, does not exceed the UP burnout temperature, an upshift is performed.

When a downshift command is issued at a time t2, the DOWN shift predicted temperature increase $T_{INH}$ is calculated, and since the predicted temperature $T_{ES}$ following a DOWN shift, which is obtained by adding the DOWN shift predicted temperature increase $T_{INH}$ to the current clutch temperature Tc, does not exceed the DOWN burnout temperature, a downshift is performed.

Thereafter, upshifts and downshifts are performed repeatedly in a similar fashion. Then, when an upshift is determined at a time t3, the predicted temperature $T_{ES}$ following the upshift is calculated, and since this predicted temperature $T_{ES}$ exceeds the UP burnout temperature, a PYUP shift, i.e. the shift mode having a reduced heat generation amount, is performed. As a result, the heat generation amount $T_{up}$ of the clutch decreases, and therefore the clutch temperature exceeding the UP burnout temperature, leading to burnout of the clutch, is avoided.

Thereafter, the clutch enters the engagement steady state such that heat radiation occurs gradually. The heat radiation amount $T_{down}$, or in other words the temperature decrease gradient, at this time is determined on the basis of the temperature difference between the clutch temperature immediately after upshifts performed from the time t3 onward and the oil temperature $T_{OIL}$.

When a downshift is determined at a time t4, the post-shift predicted temperature $T_{ES}$ upon execution of a downshift in the normal shift mode is calculated, and since this predicted temperature $T_{ES}$ exceeds the DOWN burnout temperature, the predicted temperature $T_{ES}$ following a PYDOWN shift, i.e. the shift mode having a reduced heat generation amount, is calculated. However, the predicted temperature $T_{ES}$ following a PYDOWN shift also exceeds the DOWN burnout temperature, and therefore execution of the determined downshift is prohibited.

When a downshift is determined again at a time t5, the post-shift predicted temperature $T_{ES}$ upon execution of a downshift in the normal shift mode is calculated, and since this predicted temperature $T_{ES}$ exceeds the DOWN burnout temperature, the predicted temperature $T_{ES}$ following a PYDOWN shift is calculated. The predicted temperature $T_{ES}$ following a PYDOWN shift, i.e. the shift mode having a reduced heat generation amount, does not exceed the DOWN burnout temperature, and therefore a PYDOWN shift is performed.

Thereafter, the clutch enters the disengagement steady state such that heat radiation occurs gradually. The heat radiation amount $T_{down}$, or in other words the temperature decrease gradient, at this time is determined on the basis of the temperature difference between the clutch temperature immediately after downshifts performed from the time t5 onward and the oil temperature $T_{OIL}$.

When the clutch resetting set time elapses or the clutch temperature falls to or below the oil temperature $T_{OIL}$ after the time t5, the clutch temperature is held at the oil temperature $T_{OIL}$ (a constant value).

Next, actions and effects obtained by performing the above control will be described.

According to the control described above, the UP burnout temperature is set at a higher temperature than the DOWN burnout temperature during normal travel, and therefore upshifts can be permitted to a maximum extent, while downshifts can be prohibited appropriately, taking into consideration the possibility that an upshift may be performed immediately after a downshift.

Further, when the possibility of a driving force deficiency exists during uphill road travel, the DOWN burnout temperature is set at a higher temperature (the uphill DOWN burnout temperature) than the DOWN burnout temperature during normal travel, and more downshifts are permitted than during normal travel. As a result, downshifts are performed actively, and deterioration of the drivability due to a driving force deficiency is prevented even during travel along an uphill road. When traveling along an uphill road, an upshift is almost never performed immediately after a downshift, and therefore the friction elements are protected sufficiently even though more downshifts are permitted than during normal travel.

Furthermore, when the possibility of a driving force deficiency exists during uphill road travel, the UP burnout temperature is set at a lower temperature (the uphill UP burnout temperature) than the DOWN burnout temperature. Therefore, upshifts can be prohibited appropriately, taking into consideration the possibility of a driving force deficiency following an upshift, and deterioration of the drivability due to a driving force deficiency during uphill road travel can be prevented. During uphill road travel, driving force deficiencies tend to occur and the need to perform an upshift arises extremely infrequently. Hence, problems (over-revving, for example) caused by upshift prohibition do not occur even though upshifts are prohibited.

Second Embodiment

Next, a second embodiment of this invention will be described.

The second embodiment differs from the first embodiment in the method of setting the UP burnout temperature and the DOWN burnout temperature. Only this difference will be described below.

Figure 25:
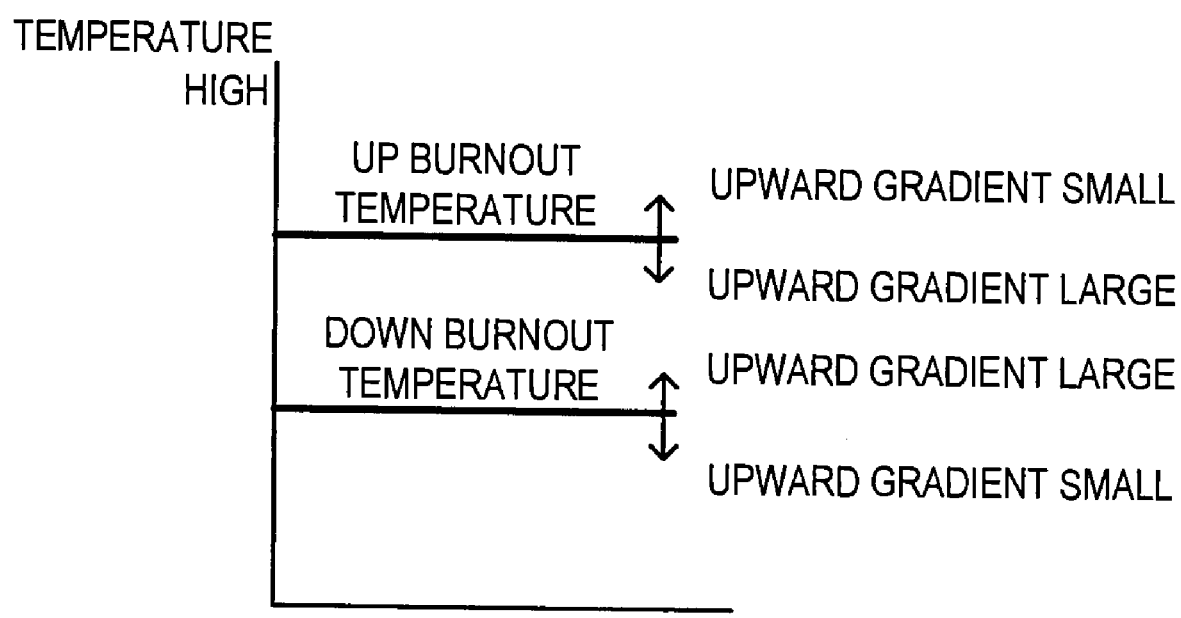
FIG. 25 is a view illustrating an UP burnout temperature and a DOWN burnout temperature set in a second embodiment.

FIG. 25 shows the manner in which the UP burnout temperature and the DOWN burnout temperature are set in the second embodiment, and corresponds to the burnout temperature setting unit 110 and the processing of the step S22 in FIG. 13.

According to FIG. 25, the UP burnout temperature and the DOWN burnout temperature are set to be variable in accordance with the upward gradient of the traveling road. The UP burnout temperature is set at a higher temperature than the DOWN burnout temperature, but as the upward gradient increases, the UP burnout temperature (first predetermined value) is set at a lower temperature and the DOWN burnout temperature (second predetermined value) is set at a higher temperature. By setting the UP burnout temperature and the DOWN burnout temperature in accordance with the upward gradient of the traveling road in this manner, upshifts can be prohibited and more downshifts can be permitted during uphill road travel, and as a result, driving force deficiencies can be prevented.

According to the second embodiment, the UP burnout temperature is set at a higher temperature than the DOWN burnout temperature, and therefore upshifts can be permitted to a maximum extent, while downshifts can be prohibited appropriately, taking into consideration the possibility that an upshift may be performed after a downshift.

Furthermore, the UP burnout temperature is set lower as the upward gradient increases, and therefore fewer upshifts are permitted. Hence, a driving force deficiency occurring when an upshift is performed during uphill road travel, leading to deterioration of the drivability, can be prevented. When the upward gradient is large, driving force deficiencies tend to occur and the need to perform an upshift arises extremely infrequently. Therefore, problems (over-revving, for example) caused by upshift prohibition do not occur even though upshifts are prohibited.

Moreover, the DOWN burnout temperature is set higher as the upward gradient increases, and therefore more downshifts are permitted. Hence, a driving force deficiency occurring when a downshift is not performed during uphill road travel, leading to deterioration of the drivability, can be prevented. During uphill road travel, the need to perform an upshift following a downshift arises infrequently, and therefore protection of the friction elements is almost never reduced even though more downshifts are permitted than during normal travel.

Embodiments of this invention were described above, but the technical scope of this invention is not limited to the specific constitutions of the embodiments described here, and various alterations and modifications may be implemented within the scope of the technical spirit of the invention.

For example, the first embodiment and second embodiment may be combined such that the normal UP burnout temperature and the normal DOWN burnout temperature of the first embodiment are set to be variable in accordance with the upward gradient of the traveling road, as in the second embodiment, but the uphill UP burnout temperature and the uphill DOWN burnout temperature are used when a driving force deficiency occurs. Alternatively, the uphill UP burnout temperature and the uphill DOWN burnout temperature of the first embodiment may be set to be variable in accordance with the upward gradient of the traveling road, as in the second embodiment.

This application claims priority based on JP2008-86470, filed with the Japan Patent Office on Mar. 28, 2008, the entire content of which is incorporated into this specification by reference.

What is claimed is:

1. A shift control device for an automatic transmission, which executes a shift from a current gear position to a target gear position by selectively engaging and disengaging a plurality of friction elements, comprising:
 a thermal load prediction unit which predicts a thermal load state of the friction element upon completion of the shift from a current thermal load state of the friction element; and a shift control unit which, when the thermal load state upon shift completion predicted by the thermal load prediction unit corresponds to a predetermined state, either performs the shift in a modified shift mode in which a heat generation amount of the friction element is smaller than the heat generation amount of the friction element when the predetermined state is not established, or prohibits the shift, wherein the predetermined state is set at a different state in a case where the shift is an upshift and in a case where the shift is a downshift, and is set on the basis of a gradient of a traveling road.

2. The shift control device as defined in claim 1, further comprising a driving force deficiency determination unit which determines, on the basis of at least the gradient of the traveling road, whether or not a possibility of a driving force deficiency due to uphill road travel exists, wherein, when the driving force deficiency determination unit determines that the possibility of a driving force deficiency due to uphill road travel does not exist, the predetermined state is set as a state in which the thermal load of the friction element is equal to or greater than a first predetermined value in a case where the shift is an upshift and as a state in which the thermal load of the friction element is equal to or greater than a second predetermined value, which is lower than the first predetermined value, in a case where the shift is a downshift, and when the driving force deficiency determination unit determines that the possibility of a driving force deficiency due to uphill road travel does exist, the predetermined state is set as a state in which the thermal load of the friction element is equal to or greater than a third predetermined value, which is higher than the second predetermined value, in a case where the shift is a downshift.

3. The shift control device as defined in claim 2, wherein, when the driving force deficiency determination unit determines that the possibility of a driving force deficiency due to uphill road travel exists, the predetermined state is set as a state in which the thermal load of the friction element is equal to or greater than a fourth predetermined value, which is lower than the third predetermined value, in a case where the shift is an upshift.

4. The shift control device as defined in claim 1, wherein the predetermined state is set as a state in which the thermal load of the friction element is equal to or greater than a first predetermined value in a case where the shift is an upshift and as a state in which the thermal load of the friction element is equal to or greater than a second predetermined value in a case where the shift is a downshift, the first predetermined value is set at a higher value than the second predetermined value, and the second predetermined value is set at a higher value as an upward gradient of the traveling road increases.

5. The shift control device as defined in claim 1, wherein the predetermined state is set as a state in which the thermal load of the friction element is equal to or greater than a first predetermined value in a case where the shift is an upshift and as a state in which the thermal load of the friction element is equal to or greater than a second predetermined value in a case where the shift is a downshift, the first predetermined value is set at a higher value than the second predetermined value, and the first predetermined value is set at a lower value as an upward gradient of the traveling road increases.

6. The shift control device as defined in claim 1, further comprising:

a current thermal load calculation unit which calculates the current thermal load state of the friction element; and a heat generation amount prediction unit which predicts a heat generation amount of the friction element when the shift is performed before the shift begins, wherein the thermal load prediction unit predicts the thermal load state of the friction element upon completion of the shift on the basis of the calculated current thermal load state and the predicted heat generation amount of the friction element.

7. A shift control method for an automatic transmission, which executes a shift from a current gear position to a target gear position by selectively engaging and disengaging a plurality of friction elements, comprising:

predicting a thermal load state of the friction element upon completion of the shift from a current thermal load state of the friction element;

when the predicted thermal load state upon shift completion corresponds to a predetermined state, either performing the shift in a modified shift mode in which a heat generation amount of the friction element is smaller than the heat generation amount of the friction element when the predetermined state is not established, or prohibiting the shift, and setting the predetermined state on the basis of a gradient of a traveling road at a different state in a case where the shift is an upshift and in a case where the shift is a downshift.

8. The shift control method as defined in claim 7, further comprising:

determining, on the basis of at least the gradient of the traveling road, whether or not a possibility of a driving force deficiency due to uphill road travel exists, when it is determined that the possibility of a driving force deficiency due to uphill road travel does not exist, setting the predetermined state as a state in which the thermal load of the friction element is equal to or greater than a first predetermined value in a case where the shift is an upshift and as a state in which the thermal load of the friction element is equal to or greater than a second predetermined value, which is lower than the first predetermined value, in a case where the shift is a downshift, and when it is determined that the possibility of a driving force deficiency due to uphill road travel does exist, setting the predetermined state a state in which the thermal load of the friction element is equal to or greater than a third predetermined value, which is higher than the second predetermined value, in a case where the shift is a downshift.

9. The shift control method as defined in claim 8, further comprising:

when it is determined that the possibility of a driving force deficiency due to uphill road travel exists, setting the predetermined state as a state in which the thermal load of the friction element is equal to or greater than a fourth predetermined value, which is lower than the third predetermined value, in a case where the shift is an upshift.

10. The shift control method as defined in claim 7, further comprising:

setting the predetermined state as a state in which the thermal load of the friction element is equal to or greater than a first predetermined value in a case where the shift is an upshift and as a state in which the thermal load of the friction element is equal to or greater than a second predetermined value in a case where the shift is a downshift, setting the first predetermined value at a higher value than the second predetermined value, and setting the second predetermined value at a higher value as an upward gradient of the traveling road increases.

11. The shift control method as defined in claim 7, further comprising:

setting the predetermined state as a state in which the thermal load of the friction element is equal to or greater than a first predetermined value in a case where the shift is an upshift and as a state in which the thermal load of the friction element is equal to or greater than a second predetermined value in a case where the shift is a downshift, setting the first predetermined value at a higher value than the second predetermined value, and setting the first predetermined value at a lower value as an upward gradient of the traveling road increases.

12. The shift control method as defined in claim 7, further comprising:

calculating the current thermal load state of the friction element; and predicting a heat generation amount of the friction element when the shift is performed before the shift begins, wherein the thermal load state of the friction element upon completion of the shift is predicted on the basis of the calculated current thermal load state and the predicted heat generation amount of the friction element.

13. A shift control device for an automatic transmission, which executes a shift from a current gear position to a target gear position by selectively engaging and disengaging a plurality of friction elements, comprising:

means for predicting a thermal load state of the friction element upon completion of the shift from a current thermal load state of the friction element, means for, when the predicted thermal load state upon shift completion corresponds to a predetermined state, either performing the shift in a modified shift mode in which a heat generation amount of the friction element is smaller than the heat generation amount of the friction element when the predetermined state is not established, or prohibiting the shift, and means for setting the predetermined state on the basis of a gradient of a traveling road at a different state in a case where the shift is an upshift and in a case where the shift is a downshift.

14. The shift control device as defined in claim 13, further comprising means for determining, on the basis of at least the gradient of the traveling road, whether or not a possibility of a driving force deficiency due to uphill road travel exists, means for, when it is determined that the possibility of a driving force deficiency due to uphill road travel does not exist, setting the predetermined state as a state in which the thermal load of the friction element is equal to or greater than a first predetermined value in a case where the shift is an upshift and as a state in which the thermal load of the friction element is equal to or greater than a second predetermined value, which is lower than the first predetermined value, in a case where the shift is a downshift, and means for, when it is determined that the possibility of a driving force deficiency due to uphill road travel does exist, setting the predetermined state as a state in which the thermal load of the friction element is equal to or greater than a third predetermined value, which is higher than the second predetermined value, in a case where the shift is a downshift.

15. The shift control device as defined in claim 14, further comprising means for, when it is determined that the possibility of a driving force deficiency due to uphill road travel exists, setting the predetermined state as a state in which the thermal load of the friction element is equal to or greater than a fourth predetermined value, which is lower than the third predetermined value, in a case where the shift is an upshift.

16. The shift control device as defined in claim 13, further comprising means for setting the predetermined state as a state in which the thermal load of the friction element is equal to or greater than a first predetermined value in a case where the shift is an upshift and as a state in which the thermal load of the friction element is equal to or greater than a second predetermined value in a case where the shift is a downshift, means for setting the first predetermined value at a higher value than the second predetermined value, and means for setting the second predetermined value at a higher value as an upward gradient of the traveling road increases.

17. The shift control device as defined in claim 13, further comprising means for setting the predetermined state as a state in which the thermal load of the friction element is equal to or greater than a first predetermined value in a case where the shift is an upshift and as a state in which the thermal load of the friction element is equal to or greater than a second predetermined value in a case where the shift is a downshift, means for setting the first predetermined value at a higher value than the second predetermined value, and means for setting the first predetermined value at a lower value as an upward gradient of the traveling road increases.

18. The shift control device as defined in claim 13, further comprising:

means for calculating the current thermal load state of the friction element; and means for predicting a heat generation amount of the friction element when the shift is performed before the shift begins, wherein the means for predicting the thermal load state predicts the thermal load state of the friction element upon completion of the shift on the basis of the calculated current thermal load state and the predicted heat generation amount of the friction element.

* * * * *